United States Patent
Glover et al.

(10) Patent No.: US 10,510,095 B2
(45) Date of Patent: Dec. 17, 2019

(54) SEARCHING BASED ON A LOCAL DENSITY OF ENTITIES

(71) Applicant: Samsung Electronics Co., Ltd., Suwon-si, Gyeonggi-do (KR)

(72) Inventors: Eric J. Glover, Palo Alto, CA (US); Michael Harris, Mountain View, CA (US); Patrick La Victoire, Los Altos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1308 days.

(21) Appl. No.: 14/489,662

(22) Filed: Sep. 18, 2014

(65) Prior Publication Data
US 2015/0379027 A1    Dec. 31, 2015

Related U.S. Application Data

(60) Provisional application No. 62/018,813, filed on Jun. 30, 2014.

(51) Int. Cl.
*G06Q 30/02* (2012.01)
*G06F 16/487* (2019.01)
(Continued)

(52) U.S. Cl.
CPC ....... *G06Q 30/0261* (2013.01); *G06F 16/487* (2019.01); *G06F 16/29* (2019.01); *G06F 16/81* (2019.01)

(58) Field of Classification Search
CPC .......... G06Q 30/0261; G06F 17/30241; G06F 17/3087; G06F 17/30554; G06F 17/30321;
(Continued)

(56) References Cited

U.S. PATENT DOCUMENTS

| 6,108,650 A | 8/2000 | Musk et al. |
| 2003/0033176 A1* | 2/2003 | Hancock ............... G01C 21/20 705/6 |

(Continued)

FOREIGN PATENT DOCUMENTS

JP    2007156979 A    6/2007

OTHER PUBLICATIONS

International Search Report and Written Opinion for related WO Application No. PCT/US2015/035962, dated Sep. 22, 2015.

*Primary Examiner* — Shahid A Alam
*Assistant Examiner* — Andalib F Lodhi
(74) *Attorney, Agent, or Firm* — Jefferson IP Law, LLP

(57) ABSTRACT

A method executed by a computing device includes receiving a search criteria and location data from a user device in communication with the computing device, determining a user location based on the location data, and determining a geographical density of entities about the user location. The method optionally includes selecting one or more access mechanisms based on the search criteria and the geographical density. Each access mechanism, when executed by the user device, causes the user device to access a resource identified by the access mechanism. The method also optionally includes transmitting search results containing the one or more selected access mechanisms from the computing device to the user device.

23 Claims, 17 Drawing Sheets

(51) Int. Cl.
*G06F 16/81* (2019.01)
*G06F 16/29* (2019.01)

(58) Field of Classification Search
CPC .. G06F 17/30539; G06F 17/509; G06F 16/29;
G06F 16/81; G06F 16/487; G06F
16/9537; G06F 16/248; G06F 16/56;
G06F 16/245; G06F 16/24578
USPC .......................................................... 707/724
See application file for complete search history.

(56) References Cited

U.S. PATENT DOCUMENTS

| | | | |
|---|---|---|---|
| 2006/0097718 A1* | 5/2006 | Schlicker | G01N 27/023 324/228 |
| 2008/0097966 A1 | 4/2008 | Choi et al. | |
| 2008/0306927 A1 | 12/2008 | Hoernkvist | |
| 2011/0095941 A1* | 4/2011 | Yousefi | G06F 17/509 342/179 |
| 2011/0313657 A1* | 12/2011 | Myllymaki | G01C 21/3682 701/438 |
| 2012/0089914 A1* | 4/2012 | Holt | G06F 3/0485 715/728 |
| 2012/0221548 A1 | 8/2012 | Delli Santi et al. | |
| 2013/0117067 A1* | 5/2013 | Sullivan | G06Q 30/0202 705/7.29 |
| 2014/0074820 A1* | 3/2014 | Murphy | G06Q 30/0256 707/722 |
| 2014/0307178 A1* | 10/2014 | Tang | G06F 3/044 349/12 |
| 2014/0365246 A1* | 12/2014 | Hayward | G06Q 40/08 705/4 |
| 2015/0168147 A1* | 6/2015 | Duleba | G01C 21/20 701/533 |

* cited by examiner

SEARCHING BASED ON A LOCAL DENSITY OF ENTITIES

CROSS REFERENCE TO RELATED APPLICATIONS

This U.S. patent application claims priority under 35 U.S.C. § 119(e) to U.S. Provisional Application 62/018,813, filed on Jun. 30, 2014, which is hereby incorporated by reference in its entirety.

TECHNICAL FIELD

This disclosure relates to generating search results based on a local density of entities within a geographical area.

BACKGROUND

In recent years, use of computers, smartphones, and other Internet-connected devices has grown exponentially. Correspondingly, the number of available software applications for such devices has also grown. Today, many diverse native and web software applications can be accessed on any number of different devices, including, but not limited to, smartphones, personal computers, automobiles, and televisions. These diverse applications can range from business driven applications, games, educational applications, news applications, shopping applications, messaging applications, media streaming applications, social networking applications, and so much more. Furthermore, application developers develop vast amounts of applications within each genre and each application may have numerous editions.

SUMMARY

The disclosure is directed to techniques for searching based on the local density of entities (e.g., businesses). The system/method uses an entity density grid having nodes arranged at different latitude/longitude values. Each node is assigned an entity density value that indicates the number of entities in the area around the node. At search time, the search system assigns an entity density value to the user based on the user's location. The search system then filters/scores search results based on the entity density value.

One aspect of the disclosure provides a method executed by a computing device. The method includes receiving a search criteria and location data from a user device in communication with the computing device, determining a user location based on the location data, and determining a geographical density of entities about the user location. The method optionally includes selecting one or more access mechanisms based on the search criteria and the geographical density. Each access mechanism, when executed by the user device, causes the user device to access a resource identified by the access mechanism. The method also optionally includes transmitting search results containing the one or more selected access mechanisms from the computing device to the user device.

Implementations of the disclosure may include one or more of the following optional features. In some implementations, the location data is indicative of a location of a user computing device originating the search criteria. For example, the location data may be a geo-location. The step of determining the geographical density of entities may include selecting an entity density associated with a node of an entity density grid closest to the user location. The entity density grid, in some examples, has latitude lines and longitudinal lines and a node at one or more intersections of the latitude lines and longitudinal lines. In some implementations, the step of determining the geographical density of entities includes generating an entity density grid for a geographical area, where the entity density grid has nodes, and each node has an associated entity density value. The method includes increasing the entity density value of one or more nodes based on a location of an entity with respect to the one or more nodes and determining the geographical density of entities about the user location as the entity density value associated with the closest node to the user location. In some implementations, for each entity located within the entity density grid, the method includes increasing the entity density value of a node closest to the entity. In other implementations, for each entity located within the entity density grid, the method includes increasing the entity density value of one or more nodes closest to the entity. The increase in the entity density value corresponds to a distance between the entity and the respective node. In additional examples, each node of the entity density grid has an associated geographical coordinate (e.g., and not on any particular grid of lines) and an entity density value.

The method may optionally include filtering access mechanisms based on the user location. In some examples, the method includes filtering out access mechanisms corresponding to entities located outside a geographical boundary about the user location. Other types of filtering are possible as well. A size and/or shape of the geographical boundary may be based on the geographical density of entities.

Selecting the one or more access mechanisms may optionally include generating and scoring a consideration set of function records. The consideration set of function records is based on the search criteria. Moreover, each function record has an associated access mechanism, application state information, and an entity location. The method further includes scoring the consideration set of function records based on the associated entity location with respect the user location and a correspondence of the application state information to the search criteria.

Additionally or alternatively, selecting the one or more access mechanisms may include generating a consideration set of function records based on the search criteria, where each function record has an associated access mechanism and an entity location, determining a geographical boundary about the user location based on the geographical density of entities, and filtering out function records from the consideration set having an associated entity location outside the geographical boundary.

In some implementations, the access mechanism, when executed by the user device, causes the user device to access a native application installed on the user device, launch a web browser installed on the user device and access a web resource identified by the access mechanism, or access a digital distribution platform and download an application identified by the access mechanism.

Another aspect of the disclosure provides a system that includes one or more computing devices in communication with a user device. The one or more computing devices execute instructions that cause the one or more computing devices to receive a search criteria and location data from the user device, determine a user location based on the location data, and determine a geographical density of entities about the user location. The one or more computing devices may optionally select one or more access mechanisms based on the search criteria and the geographical density and transmit search results containing the one or more selected access mechanisms to the user device. Each access mechanism, when executed by the user device, causes the user device to access a resource identified by the access mechanism.

In some implementations, the location data is indicative of a location of a user computing device originating the search criteria. For example, the location data may be a geo-location.

The one or more computing devices may determine the geographical density of entities by selecting an entity density associated with a node of an entity density grid closest to the user location. The entity density grid may have latitude lines and longitudinal lines and a node at one or more intersections of the latitude lines and longitudinal lines. The one or more computing devices may store the entity density grid (or pertinent data thereof) in non-transitory memory in communication with the one or more computing devices. In some examples, the one or more computing devices store map coordinates (i.e., latitude and longitude pairs) of nodes and the entity density values associated with those coordinates (nodes). Any coordinate not found in the memory may have an assumed entity density value of zero at search time. Moreover, one or more entity density values may have a value of zero (e.g., when no entities exist nearby).

In some examples, the one or more computing devices determine the geographical density of entities by generating an entity density grid for a geographical area, where the entity density grid has nodes, each node having an associated entity density value, and increasing the entity density value of one or more nodes based on a location of an entity with respect to the one or more nodes. The one or more computing devices determine the geographical density of entities about the user location as the entity density value associated with the closest node to the user location. In some examples, the entity density grid may have latitude lines and longitudinal lines and nodes at intersections of the latitude lines sand longitudinal lines. In additional examples, each node of the entity density grid has an associated geographical coordinate (e.g., and not on any particular grid of lines) and an entity density value.

In some implementations, the one or more computing devices determine the geographical density of entities by, for each entity located within the entity density grid, increasing the entity density value of a node closest to the entity. In other implementations, the one or more computing devices determine the geographical density of entities by, for each entity located within the entity density grid, increasing the entity density value of one or more nodes closest to the entity. The increase in the entity density value corresponds to a distance between the entity and the respective node.

The one or more computing devices may select one or more access mechanisms by filtering access mechanisms based on the user location. For example, the one or more computing devices may filter out access mechanisms corresponding to entities located outside a geographical boundary about the user location. A size and/or shape of the geographical boundary may be based on the geographical density of entities.

In some implementations, the one or more computing devices select one or more access mechanisms by generating and scoring a consideration set of function records. The consideration set of function records is based on the search criteria. Moreover, each function record has an associated access mechanism, application state information, and an entity location. The one or more computing devices score the consideration set of function records based on the associated entity location with respect the user location and a correspondence of the application state information to the search criteria.

Additionally, or alternatively, selecting the one or more access mechanisms may include generating a consideration set of function records based on the search criteria, where each function record has an associated access mechanism and an entity location, determining a geographical boundary about the user location based on the geographical density of entities, and filtering out function records from the consideration set having an associated entity location outside the geographical boundary.

The access mechanism, when executed by the user device, may cause the user device to access a native application installed on the user device, launch a web browser installed on the user device and access a web resource identified by the access mechanism, or access a digital distribution platform and download an application identified by the access mechanism.

In yet another aspect of the disclosure, a method includes receiving a search query and user location from a user device and identifying function records included in a data store based on the received search query. Each of the function records includes an access mechanism specifying a state of an application, application state information describing the state of the application specified by the access mechanism, and a location of an entity associated with the function record. The method optionally includes determining a search scope based on the user location. The search scope includes a geo-location and a geographical area surrounding the geo-location. For each function record, the method includes determining whether the respective entity location is located within the geographical area of the search scope, selecting access mechanisms from function records having a respective entity location located within the geographical area of the search scope, and transmitting the selected access mechanisms to the user device.

In some implementations, determining the search scope includes generating an entity density grid for a geographical region. The entity density grid has nodes, and each node has an associated entity density value. The method includes increasing the entity density value of one or more nodes based on a location of an entity with respect to the one or more nodes, determining a geographical density of entities about the user location as the entity density value associated with the closest node to the user location, and determining the geographical area of the search scope based on the geographical density of entities about the user location.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A search system of the present disclosure implements a search based on a local density of entities around a user device location. For example, a user in the city center of Mountain View, Calif. (e.g., on Castro St. in Mountain View, Calif.) searching for a coffee shop may likely have a preference for a coffee shop close to a geo-location of the user, while a user a mile away in a less commercial area might be more willing to travel a mile or further (e.g., to the city center) to visit a coffee shop. Moreover, a user in Montana, which is generally less populated that Silicon Valley, may be more willing to travel several miles to visit a coffee shop, especially if the user's current geo-location is on a 50 acre ranch.

The search system receives a query from a user device that includes a search criteria and data indicating or indicative of the geo-location of the user device. The search system generates search results in response to the received query and transmits the search results to the user device. The search system may consider a relative geographical density of entities (e.g., business, places, etc. having a known location) about the user's geo-location when generating the search results. Moreover, the search system may use one or more location-based filtering techniques, discussed in more detail herein, when determining the search results. The search results may include various mechanisms for accessing applications or functionality of applications relevant to the search query or optionally the geo-location of the user.

Figure 1A:
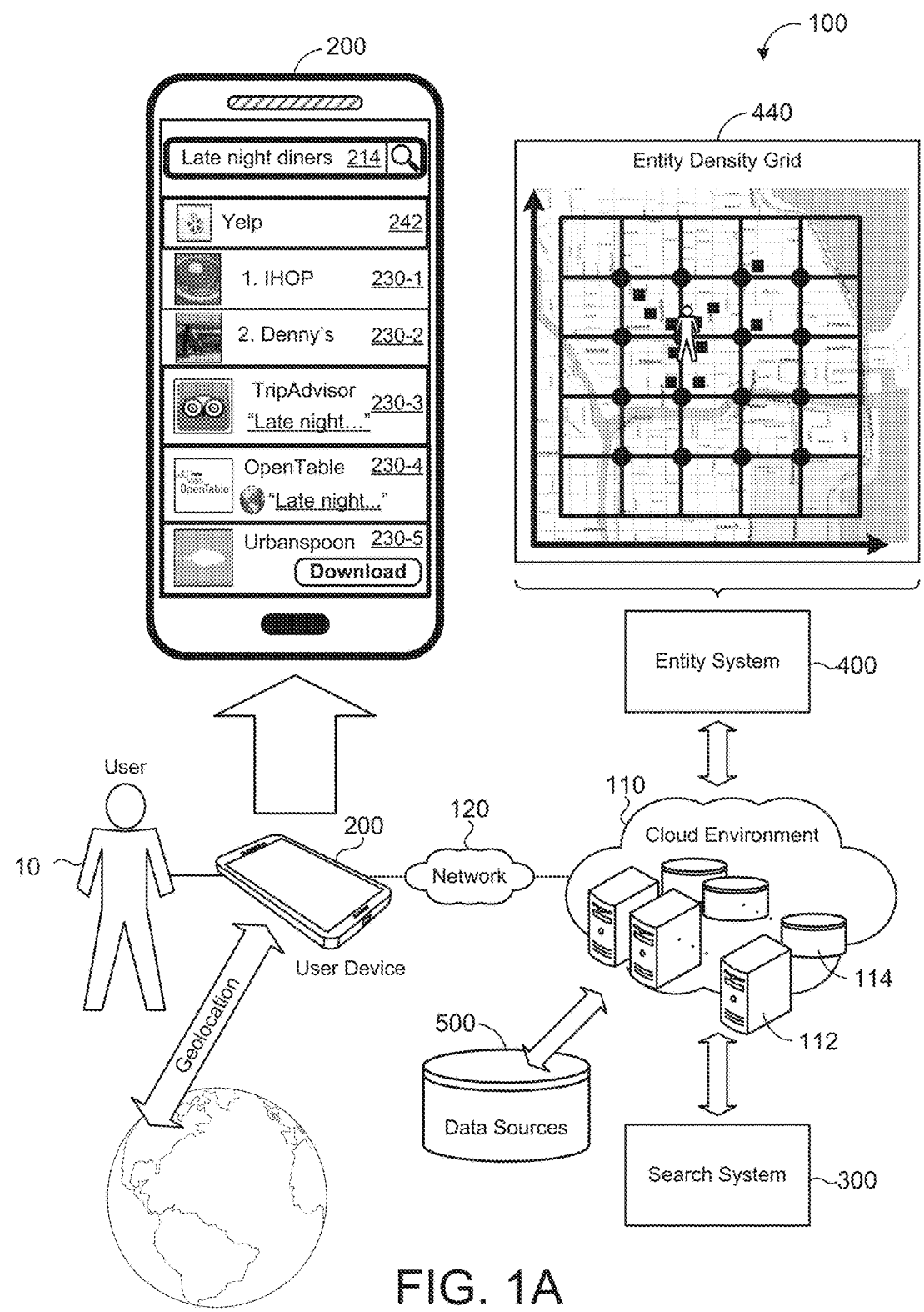
FIG. 1A is a schematic view of an example environment including a user device in communication with a search system.
Figure 1B:
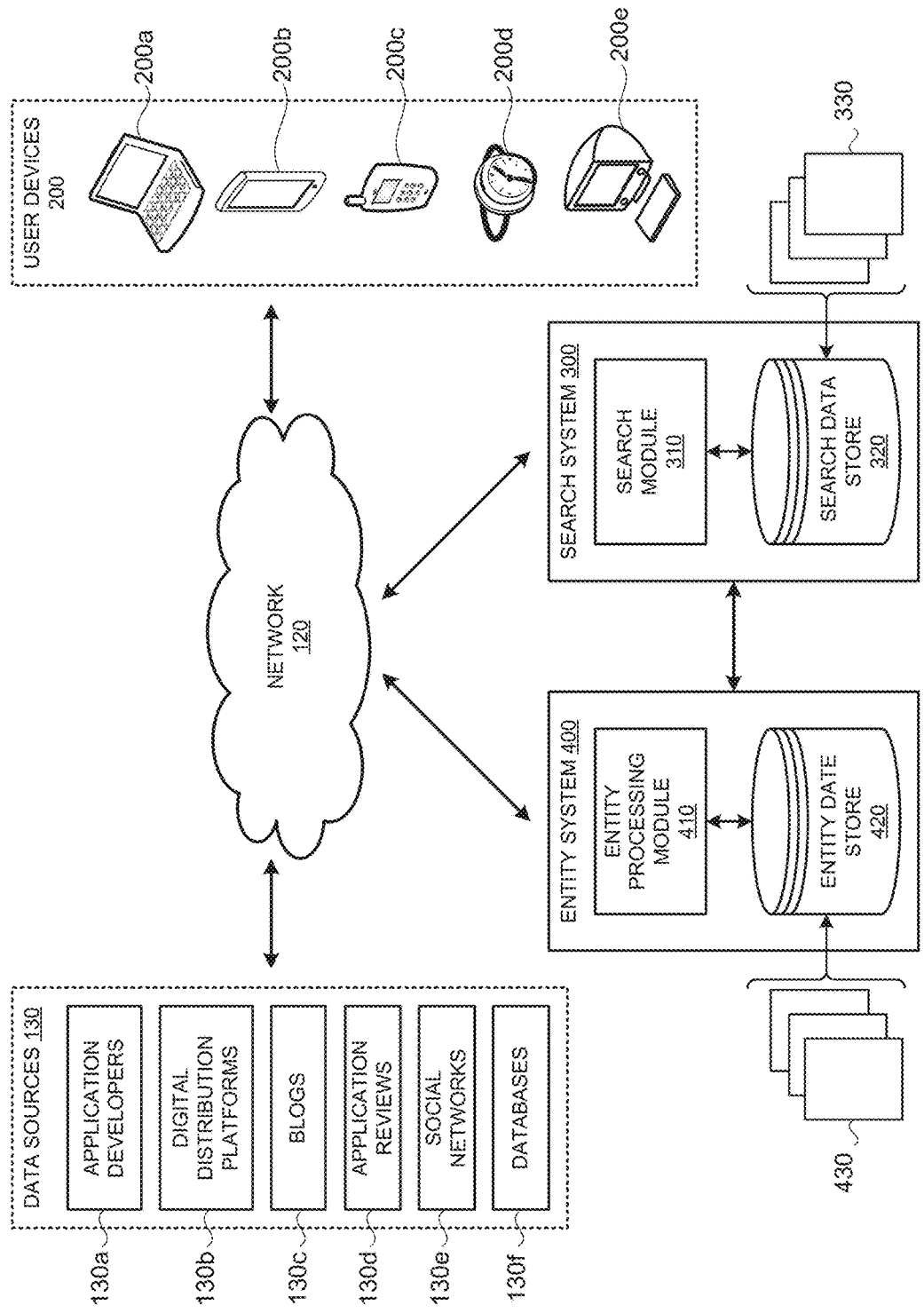
FIG. 1B is a functional block diagram of a search system interacting with an entity system, user devices, and data sources.

FIG. 1A illustrates an example system 100 that includes a user device 200 associated with a user 10 in communication with a remote system 110 via a network 120. FIG. 1B provides a functional block diagram of the system 100. The remote system 110 may be a distributed system (e.g., cloud environment) having scalable/elastic computing resources 112 and/or storage resources 114. The user device 200 and/or the remote system 110 may execute a search system 300 and an entity system 400 and optionally receive data from one or more data sources 130. In some implementations, the search system 300 and the entity system 400 communicate with one or more user devices 200 and the data source(s) 130 via the network 120. The network 120 may include various types of networks, such as a local area network (LAN), wide area network (WAN), and/or the Internet.

Figure 2:
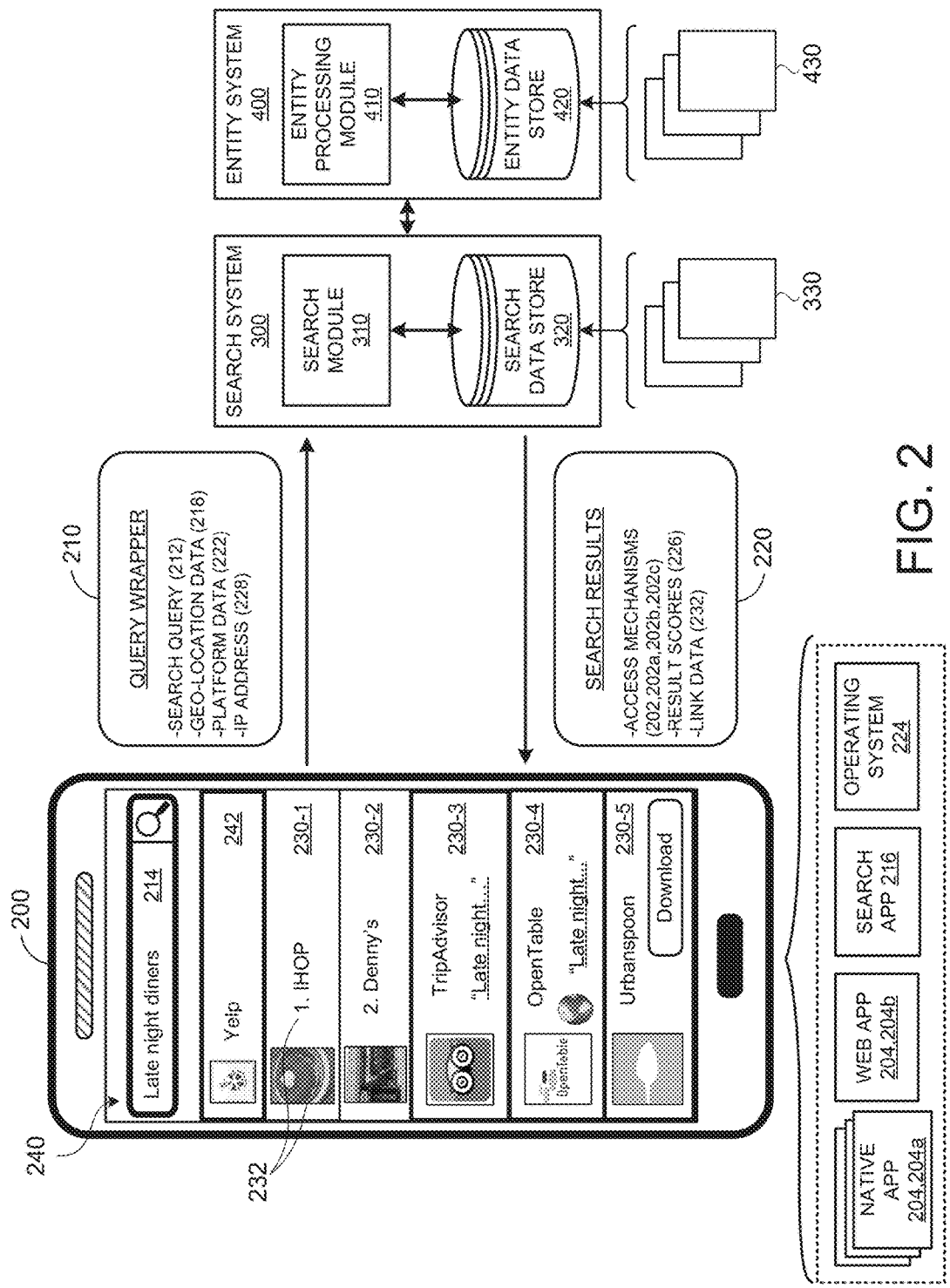
FIG. 2 is a schematic view of an example user device in communication with a search system.

FIG. 2 shows an example user device 200 in communication with the search system 300. User devices 200 can be any computing devices that are capable of providing queries 210 to the search system 300. User devices 200 include, but are not limited to, mobile computing devices, such as laptops 200a, tablets 200b, smart phones 200c, and wearable computing devices 200d (e.g., headsets and/or watches). User devices 200 may also include other computing devices having other form factors, such as computing devices included in desktop computers 200e, vehicles, gaming devices, televisions, or other appliances (e.g., networked home automation devices and home appliances).

The user devices 200 may use a variety of different operating systems 224. In examples where a user device 200 is a mobile device, the user device 200 may run an operating system including, but not limited to, ANDROID® developed by Google IOS® developed by Apple Inc., or WINDOWS PHONE® developed by Microsoft Corporation. Accordingly, the operating system 224 running on the user device 200 may include, but is not limited to, one of ANDROID®, IOS®, or WINDOWS PHONE®. In an example where a user device is a laptop or desktop computing device, the user device may run an operating system including, but not limited to, MICROSOFT WINDOWS® by Microsoft Corporation, MAC OS® by Apple, Inc., or Linux. User devices 200 may also access the search system 300 while running operating systems 224 other than those operating systems 224 described above, whether presently available or developed in the future.

A software application 204 may refer to computer software that, when executed by a computing device, causes the computing device to perform a task. In some examples, a software application 204 may be referred to as an "application", an "app", or a "program". Example software applications 204 include, but are not limited to, word processing applications, spreadsheet applications, messaging applications, media streaming applications, social networking applications, and games.

Applications 204 can be executed on a variety of different user devices 200. In some examples, applications 204 may be installed on a user device 200 prior to a user 10 purchasing the user device 200. In other examples, the user may 10 download and applications 204 on the user device 200.

In general, the user device 200 may communicate with the search system 300 using any software application 204 that can transmit search queries 212 to the search system 300. In some examples, the user device 200 runs a native application 204a that is dedicated to interfacing with the search system 300, such as a native application 204a dedicated to searches (e.g., a search application 216). In some examples, the user device 200 communicates with the search system 300 using a more general application 204, such as a web-browser application 204b accessed using a web browser. Although the user device 200 may communicate with the search system 300 using a native application 204a and/or a web-browser application 204b, the user device 200 may be described hereinafter as using the native search application 216 to communicate with the search system 300.

Referring to FIGS. 1A-2, the search system 300 includes a search module 310 in communication with a search data store 320. The search data store 320 may include one or more databases, indices (e.g., inverted indices), tables, files, or other data structures which may be used to implement the techniques of the present disclosure. The search module 310 receives a query wrapper 210 and generates search results 220 based on the data included in the data store 320. In some implementations, the search module 310 receives a query wrapper 210 from the user device 200 and performs a search for function records 330 included in the search data store 320 based on data included in the query wrapper 210, such as a search query 212. The function records 330 include one or more access mechanisms 202 that the user device 200 can use to access different functions for a variety of different applications, such as native applications 204a installed on the user device 200. The search module 310 transmits search results 220 including a list of access mechanisms 202 to the user device 200 that generated the query wrapper 210.

The user device 200 generates user selectable links 230 based on the received search results 220 (e.g., links 230-1, 230-2, . . . , 230-5 of FIG. 2). Each user selectable link 230 displayed to the user 10 may include an access mechanism 202. The user 10 may select a user selectable link 230 on the user device 200 by interacting with the link 230 (e.g., touching or clicking the link). In response to selection of a link 230, the user device 200 may launch a corresponding software application 204 (e.g., a native application 204a or a web-browser application 204b) referenced by the access mechanism 202 and perform one or more operations indicated in the access mechanism 202.

The user 10 may access the functionality of an application 204 on the user device 200 on which the application 204 is installed. Additionally or alternatively, the user 10 may access the functionality of an application 204 via a remote computing device. In some examples, all of an application's functionality is included on the user device 200 on which the application 204 is installed. These applications 204 may function without communication with other computing devices (e.g., via the Internet). In additional examples, an application 204 installed on a user device 200 may access information from other remote computing devices during operation. For example, a weather application installed on a user device 200 may access the latest weather information via the Internet and display the accessed weather information to the user 10 through the installed weather application. In further examples, an application 204 (e.g., a web-browser application 204b) may be partially executed by the user device 200 and partially executed by a remote computing device 300. For example, a web-browser application 204b may be an application 204 that is executed, at least in part, by a web server and accessed by a web browser of the user device 200. Example web applications 204b may include, but are not limited to, web-based email, online auctions, and online retail sites.

Access mechanisms 202 may include at least one of a native application access mechanism 202a (hereinafter "application access mechanism"), a web access mechanism 202b, and an application download mechanism 202c. The user device 200 may use the access mechanisms 202 to access functionality of applications 204. For example, the user 10 may select a user selectable link 230 including an access mechanism 202 in order to access functionality of an application 204 indicated in the user selectable link 230. The search module 310 may transmit one or more application access mechanisms 202a, one or more web access mechanisms 202b, and one or more application download mechanisms 202c to the user device 200 in the search results 220.

An application access mechanism 202a may be a string that includes a reference to a native application 204a and indicates one or more operations for the user device 200 to perform. If a user 10 selects a user selectable link 230 including an application access mechanism 202a, the user device 200 may launch the native application 204a referenced in the application access mechanism 202a and perform the one or more operations indicated in the application access mechanism 202a.

A web access mechanism 202b may include a resource identifier that includes a reference to a web resource (e.g., a page of a web application/website). For example, a web access mechanism 202b may include a uniform resource locator (URL) (i.e., a web address) used with hypertext transfer protocol (HTTP). If a user 10 selects a user selectable link 230 including a web access mechanism 202b, the user device 200 may launch the web browser application 204b and retrieve the web resource indicated in the resource identifier. Put another way, if a user 10 selects a user selectable link 230 including a web access mechanism 202b, the user device 200 may launch a corresponding web-browser application 204b and access a state (e.g., a page) of a web application/website. In some examples, web access mechanisms 202b include URLs for mobile-optimized sites and/or full sites.

An application download mechanism 202c may indicate a location (e.g., a digital distribution platform 130b) where a native application 204a can be downloaded in the scenario where the native application 204a is not installed on the user device 200. If a user 10 selects a user selectable link 230 including an application download mechanism 202a, the user device 200 may access a digital distribution platform from which the referenced native application 204a may be downloaded. The user device 200 may access a digital distribution platform 130b using at least one of the web-browser application 204b and one of the native applications 204a.

The search module 310 is configured to receive a query wrapper 210 from the user device 200 via the network 120. A query wrapper 210 may include a search query 212, which may include text, numbers, and/or symbols (e.g., punctuation) entered into the user device 200 by the user. For example, the user 10 may enter the search query 212 into a search field 214 (e.g., a search box) of a graphical user interface (GUI) 240 of a search application 216 running on the user device 200. A user may enter a search query 212 using a touchscreen keypad, a mechanical keypad, a speech-to-text program, or other form of user input. In general, a search query 212 may be a request for information retrieval (e.g., search results) from the search system 300. For example, a search query 212 may be directed to retrieving a list of links 230 to application functionality or application states in examples where the search system 300 is configured to generate a list of access mechanisms 202 as search results 220. A search query 212 directed to retrieving a list of links 230 to application functionality may indicate a user's desire to access functionality of one or more applications described by the search query.

In some examples, the search application 216 may be a native application 204a installed on the user device 200. For example, the search application 216 may receive search queries 212, generate the query wrapper 210, and display received data that is included in the search results 220. In additional examples, the user device 200 may execute a web-browser application 204b that accesses a web-based search application. In this example, the user may interact with the web-based search application via a web-browser application 204b installed on the user device 200. In still more examples, the functionality attributed to the search application 216 may be included as a searching component of a larger application 204 that has additional functionality.

For example, the functionality attributed to the search application 216 may be included as part of a native/web-browser application 204a, 204b as a feature that provides search for the native/web-browser application 204a, 204b.

The query wrapper 210 may include additional data along with the search query 212. For example, the query wrapper 210 may include geo-location data 218 that indicates the location of the user device 200, such as latitude and longitude coordinates. The user device 200 may include a global positioning system (GPS) receiver that generates the geo-location data 218 transmitted in the query wrapper 210. The query wrapper 210 may also include an IP address 228, which the search module 310 may use to determine the location of the user device 200. In some examples, the query wrapper 210 may also include additional data, including, but not limited to, platform data 222 (e.g., version of the operating system 224, device type, and web-browser version), an identity of a user of the user device 200 (e.g., a username), partner specific data, and other data.

The search module 310 can use the search query 212 and the additional data included in the query wrapper 210 to generate the search results 220. For example, the search module 310 can determine a geo-location of the user device 200, which the search module 310 can use along with the search query 212 to generate the search results 220. The search module 310 can determine the geo-location of the user device 200 based on the geo-location data 218 or other data (e.g., IP address 228) included in the query wrapper 210. In some implementations, the search module 310 detects a location (e.g., a postal address, street name, city name, etc.) specified in the search query 212 (i.e., a query-specified location). In these implementations, the search module 310 can use the query-specified location along with the search query 212 to generate the search results 220.

The search module 310 performs a search for function records 330 included in the search data store 320 in response to the received query wrapper 210 (e.g., in response to the search query 212 and the geo-location data 218). In some implementations, the search module 310 generates result scores 226 for function records 330 identified during the search. The result score 226 associated with a function record 330 may indicate the relevance of the function record 330 to the search query 212. A higher result score 226 may indicate that the function record 330 is more relevant to the search query 212. The search module 310 may retrieve access mechanisms 202 from the scored function records 330. The search module 310 can transmit a result score 226 along with an access mechanism 202 retrieved from a scored function record 330 in order to indicate the rank of the access mechanism 202 among other transmitted access mechanisms 202.

The search module 310 may transmit additional data to the user device 200 along with the access mechanisms 202 and the result score(s) 226. For example, the search module 310 may transmit data (e.g., text and/or images) to be included in the user selectable links 230. Data for the user selectable links 230 (e.g., text and/or images) may be referred to herein as "link data." (e.g., link data 230). The user device 200 displays the user selectable links 230 to the user 10 based on received link data 230. Each user selectable link 230 may be associated with an access mechanism 202 included in the search results 220, such that when a user 10 selects a link 230, the user device 200 launches the application 204 referenced in the access mechanism 202 and sets the application 204 into the state specified by the access mechanism 202.

With reference to FIG. 2, the user device 200 may receive a set of search results 220 from the search module 310 in response to transmission of the query wrapper 210 to the search system 300. The GUI 240 of the search application 216 displays (e.g., renders) the search results 220 received from the search module 310. The search application 216 may display the search results 220 to the user in a variety of different ways, depending on what information is transmitted to the user device 200. In examples where the search results 220 include a list of access mechanisms 202 and link data 232, the search application 216 may display the search results 230 to the user 10 as a list of user selectable links 230 including text and images. The text and images in the links 230 may include application names associated with the access mechanisms 202, text describing the access mechanisms 202, images associated with the application 204 referenced by the access mechanisms 202 (e.g., application icons), and images associated with the application state (e.g., application screen images) defined by the access mechanisms 202.

In some implementations, the search application 216 displays the search results 220 as a list of links 230 arranged under the search field 214 in which the user 10 entered the search query 212. Moreover, the search application 216 may arrange the links 230 in order based on result scores 226 associated with the access mechanisms 202 included in the links 230. In some examples, the search application 216 groups the links 230 together if the links 230 are related to the same application 204.

Each of the links 230 includes link data 232. For example, each of the links 230 includes an image (e.g., an icon) and text (e.g., an application or business name) that may describe an application and a state of an application. Each of the links 230 may include an access mechanism so that if a user selects one of links 230, the user device 200 launches the application and sets the application into a state that is specified by the access mechanism associated with the selected link. In some implementations, the user device 200 may arrange the links 230 based on result scores associated with the access mechanisms included in the links 230. In some implementations, as illustrated in FIG. 2, links 230 for the same application 204 may be combined together in the search results 220 displayed to the user 10.

With respect to FIG. 2, it may be assumed that the YELP® native application developed by Yelp, Inc., and the TRIPADVISOR® native application developed by TripAdvisor, Inc., are installed on the user device 200. Links 230-1, 230-2 and link 230-3 reference the YELP® native application and the TRIPADVISOR® native application, respectively. The GUI 240 includes a header 242, including the name "Yelp," under which the links 230-1, 230-2 are arranged. The header 242 may indicate that the links 230-1, 230-2 arranged below the header 242 are associated with the YELP® native application 204a. Selection of link 230-1 may cause the user device 200 to launch the YELP® native application 204a and retrieve an IHOP® restaurant entry of the YELP® native application 204a. Selection of link 230-2 may cause the user device 200 to launch the YELP® native application 204a and retrieve a DENNY'S® restaurant entry of the YELP® native application 204a. Selection of link 230-3 may cause the user device 200 to launch the TRIPADVISOR® native application 204a and retrieve an entry for "Late night diners" in the TRIPADVISOR® native application 204a (e.g., a search for "Late night diners").

Link 230-4 includes a web access mechanism 202b (e.g., a URL). Selection of link 230-4 may cause the user device 200 to launch the web-browser application 204b and retrieve an entry for "Late night diners" in the OPENTABLE® web-browser application 204*b* developed by OpenTable, Inc. Link 230-5 includes an application download mechanism 202*c* for the URBANSPOON® native application 204*a* by InterActiveCorp. Selection of link 230-5 may cause the user device 200 to access a digital distribution platform 130*b* (FIG. 1B) from which the URBANSPOON® native application 204*a* can be downloaded and/or previewed. The search module 310 can be configured to transmit any combination of application access mechanisms 202*a*, web access mechanisms 202*b*, and application download mechanisms 202*c* in the search results 220.

In some examples, user devices 200 communicate with the search system 300 via a partner computing system (not illustrated). The partner computing system may be a computing system of a third party that may leverage the search functionality of the search system 300. The partner computing system may belong to a company or organization other than that which operates the search system 300. Example third parties which may leverage the functionality of the search system 300 may include, but are not limited to, interact search providers and wireless communications service providers. The user devices 200 may send search queries to the search system 300 and receive search results via the partner computing system. The partner computing system may provide a user interface to the user devices 200 in some examples and/or modify the search experience provided on the user devices 200.

FIG. 1B shows a plurality of data sources 130. The data sources 130 may be sources of data which the search system 300 (e.g., the search module 310) may use to generate and update the data store 320. The data retrieved from the data sources 130 can include any type of data related to application functionality and/or application states. Data retrieved from the data sources 130 may be used to create and/or update one or more databases, indices, tables (e.g., an access table), files, or other data structures included in the data store 320. For example, function records 330 may be created and updated based on data retrieved from the data sources 130. In some examples, some data included in a data source 130 may be manually generated by a human operator. Data included in the function records 330 may be updated over time so that the search system 300 provides up-to-date results.

The data sources 130 may include a variety of different data providers. The data sources 130 may include data from application developers 130*a*, such as application developers' websites and data feeds provided by developers. The data sources 130 may include operators of digital distribution platforms 130*b* configured to distribute native applications 204*a* to user devices 200. Example digital distribution platforms 130*b* include, but are not limited to, the GOOGLE PLAY® digital distribution platform by Google, Inc., the APP STORE® digital distribution platform by Apple, Inc., and WINDOWS PHONE® Store developed by Microsoft Corporation.

The data sources 130 may also include other websites, such as websites that include web logs 130*c* (i.e., blogs), application review websites 130*d*, or other websites including data related to applications. Additionally, the data sources 130 may include social networking sites 130*e*, such as "FACEBOOK®" by Facebook, Inc. (e.g., Facebook posts) and "TWITTER®" by Twitter Inc. (e.g., text from tweets). Data sources 130 may also include online databases 130*f* that include, but are not limited to, data related to movies, television programs, music, and restaurants. Data sources 130 may also include additional types of data sources in addition to the data sources described above. Different data sources 130 may have their own content and update rate.

Figure 3B:
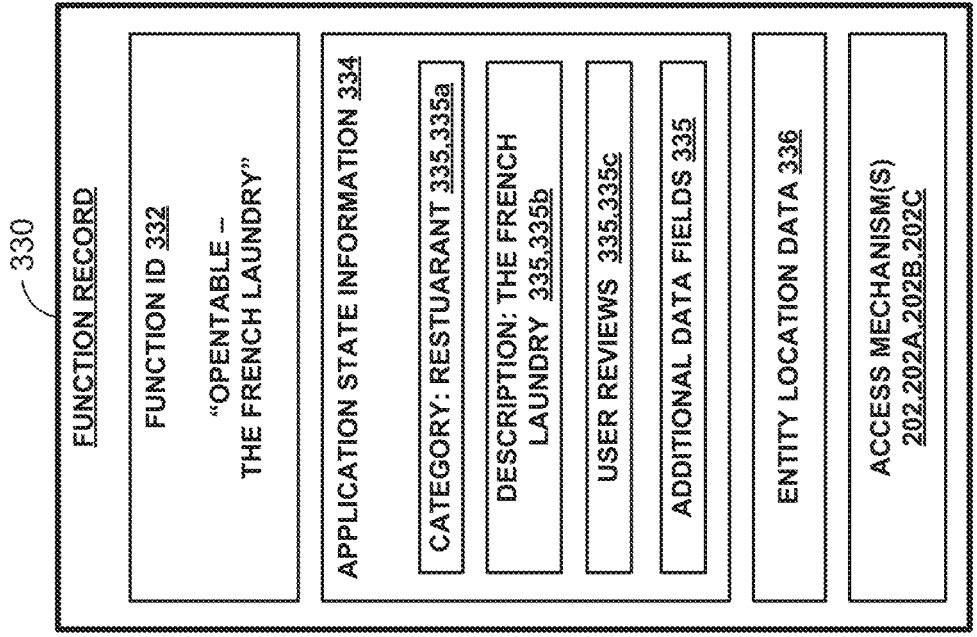
FIGS. 3A-3B are schematic views of example function records.
Figure 3A:
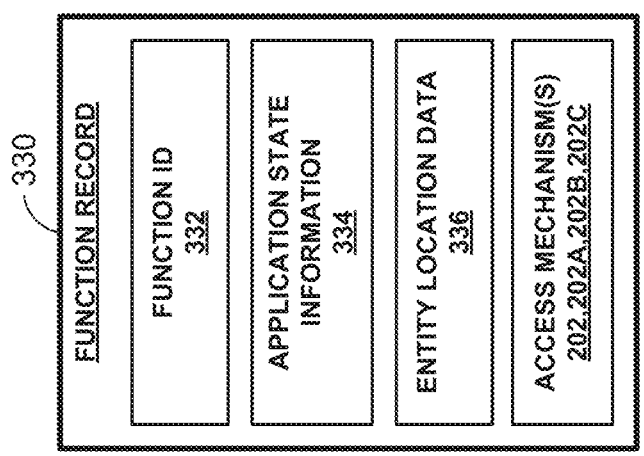

Referring to FIGS. 3A and 3B, the search data store 320 includes a plurality of different function records 330. Each function record 330 may include data related to a function of an application 204 and/or the state of the application 204 resulting from performance of the function. A function record 330 may include a function identifier (ID) 332, entity location data 336, application state information 334, and one or more access mechanisms 202, 202*a*, 202*b*, 202*c* used to access functionality provided by an application 204.

The function ID 332 may be used to identify the function record 330 among the other function records 330 included in the search data store 320. The function ID 332 may be a string of alphabetic, numeric, and/or symbolic characters (e.g., punctuation marks) that uniquely identifies the associated function record 330. In some examples, the function ID 332 describes a function and/or an application state in human readable form. For example, the function ID 332 may include the name of the application 204 referenced in the access mechanism(s) 202. Additionally or alternatively, the function ID 332 may be a human readable string that describes a function performed according to the access mechanism(s) 202 and/or an application state resulting from performance of the function according to the access mechanism(s) 202. In some examples, the function ID 332 includes a string in the format of a uniform resource locator (URL) of a web access mechanism 202*b* for the function record 330, which may uniquely identify the function record 330.

In a more specific example, if the function record 330 describes a function of the YELP® native application, the function ID 332 may include the name "Yelp" along with a description of the application state described in the application state information 334. For example, the function ID 332 for a function record 330 that describes the restaurant named "The French Laundry" may be "Yelp—The French Laundry." In an example where the function ID 332 includes a string in the format of a URL, the function ID 332 may include the following string "http://www.yelp.com/biz/the-french-laundry-yountville-2?ob=1" to uniquely identify the function record 330. In additional examples, the function ID 332 may include a URL using a namespace other than "http://," such as "func://," which may indicate that the URL is being used as a function ID in a function record. For example, the function ID 332 may include the following string "func://www.yelp.com/biz/the-french-laundly-yountville-2?ob=1."

The application state information 334 may include data that describes an application state into which an application 204 is set according to the access mechanism(s) 202 in the function record 330. Additionally or alternatively, the application state information 334 may include data that describes the function performed according to the access mechanism(s) 202 included in the function record 330. The application state information 334 may include a variety of different types of data, such as structured, semi-structured, and/or unstructured data. The application state information 334 may be automatically and/or manually generated based on documents retrieved from the data sources 130. Moreover, the application state information 334 may be updated so that up-to-date search results 220 can be provided in response to a search query 212.

In some examples, the application state information 334 includes data that may be presented to the user 10 by an application 204 when the application 204 is set in the application state defined by the access mechanism(s) 202.

For example, if one of the access mechanism(s) 202 is an application access mechanism 202a, the application state information 334 may include data that describes a state of the native application 204a after the user device 200 has performed the one or more operations indicated in the application access mechanism 202a. For example, if the function record 330 is associated with a shopping application, the application state information 334 may include data that describes products (e.g., names and prices) that are shown when the shopping application is set to the application state defined by the access mechanism(s) 202. As another example, if the function record 330 is associated with a music player application, the application state information 334 may include data that describes among (e.g., name and artist) that is played when the music player application is set to the application state defined by the access mechanism(s) 202.

The types of data included in the application state information 334 may depend on the type of information associated with the application state and the functionality defined by the access mechanism(s) 202. For example, if the function record 330 is for an application 204 that provides reviews of restaurants, the application state information 334 may include information (e.g., text and numbers) related to a restaurant, such as a category of the restaurant, reviews of the restaurant, and a menu for the restaurant. In this example, the access mechanism(s) 202 may cause the application 204 (e.g., a native application 204a or a web-browser application 204b) to launch and retrieve information for the restaurant. As another example, if the function record 330 is for an application 204 that plays music, the application state information 334 may include information related to a song, such as the name of the song, the artist, lyrics, and listener reviews. In this example, the access mechanism(s) 202 may cause the application 204 to launch and play the song described in the application state information 334.

The entity location data 336 may define a geo-location associated with the function record 330. For example, the geo-location defined by the entity location data 336 may be a geo-location or some other data indicative of a location of a place described in the application state information 334. For example, if the access mechanism(s) 202 provide access to reviews of a specific restaurant in Mountain View, Calif., then the entity location data 336 may define a geo-location (e.g., latitude and longitude coordinates) of the specific restaurant, a street address of the restaurant, a visual description of the location (e.g., a human recognizable description based on landmarks and relative distances), or some other location description.

FIG. 3B shows an example function record 330 associated with the OPENTABLE® application, developed by OpenTable, Inc. The OPENTABLE® application is a restaurant-reservation application that allows users to search for restaurants and make restaurant reservations. The OPENTABLE® application provides information about restaurants including descriptions of restaurants and user reviews of the restaurants. The example function record 330 of FIG. 3B describes an application state of the OPENTABLE® application in which the OPENTABLE® application accesses information for THE FRENCH LAUNDRY® restaurant.

The example function record 330 includes a function ID 332 of "OPENTABLE—THE FRENCH LAUNDRY," which may be used as a unique identifier to identify the function record 330. In other examples, the function ID 332 could include a URL as a unique identifier tier the function record 330. For example, the function ID 332 may include the string "http://www.opentable.com/the-french-laundry" as a unique identifier for the function record 330. As described herein, such a function ID may be included in a web access mechanism 202b of a function record 330. As another example, the function ID 332 may have a different namespace than "http://," such as "func://." In yet another example, the function ID 332 could be a string of characters, numbers, and/or symbols that are not in human readable form. Each example is optional and may be combined with other examples.

The example application state information 334 includes data fields 335, such as a category 335a of THE FRENCH LAUNDRY® restaurant, a description 335b of THE FRENCH LAUNDRY® restaurant, user reviews 335c of THE FRENCH LAUNDRY® restaurant, and additional data fields 335. The restaurant category 335a field may include the text "French cuisine" and "contemporary," for example. The description field 335b may include text that describes THE FRENCH LAUNDRY® restaurant. The user reviews field 335c may include text of user reviews for THE FRENCH LAUNDRY® restaurant. The additional data fields 335 may include additional data for THE FRENCH LAUNDRY® restaurant that may not specifically fit within the other defined fields, such as a menu for the restaurant, prices, and operating hours for the restaurant.

The function record 330 includes one or more access mechanism(s) 202. The access mechanism(s) 202 may include a reference to the OPENTABLE® application 204. An example application access mechanism 202a for the function record 330 may include a reference to the OPENTABLE® native application 204a along with one or more operations to be performed b the user device 200. For example, the application access mechanism 202a may include an application resource identifier and/or one or more operations that cause the user device 200 to access the entry for THE FRENCH LAUNDRY® restaurant in the OPENTABLE® native application. An example application resource identifier may be "vnd.opentable.deeplink:// opentable.com/restaurant/profile?rid=1180&refid=1." The function record 330 includes entity location data 336 that includes the geo-location (e.g., latitude and longitude) of THE FRENCH LAUNDRY® restaurant.

Figure 4A:
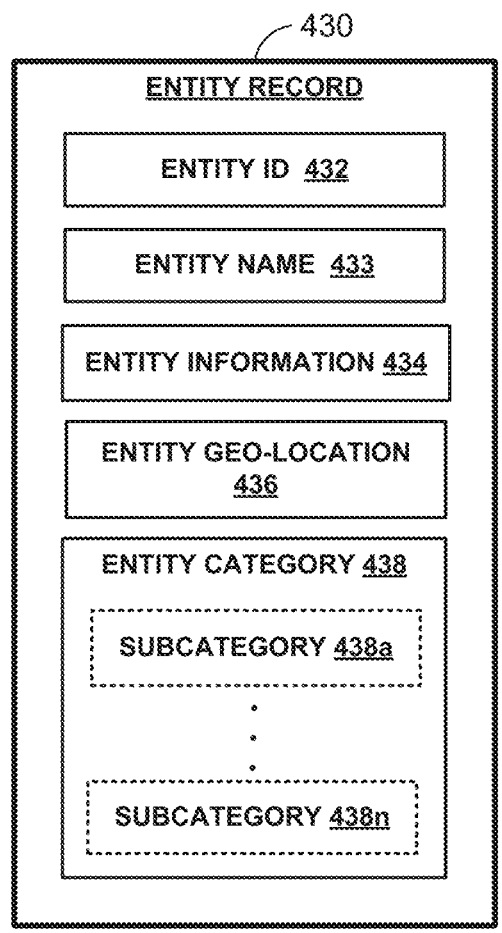
FIG. 4A is a schematic view of an example entity record.
Figure 4B:
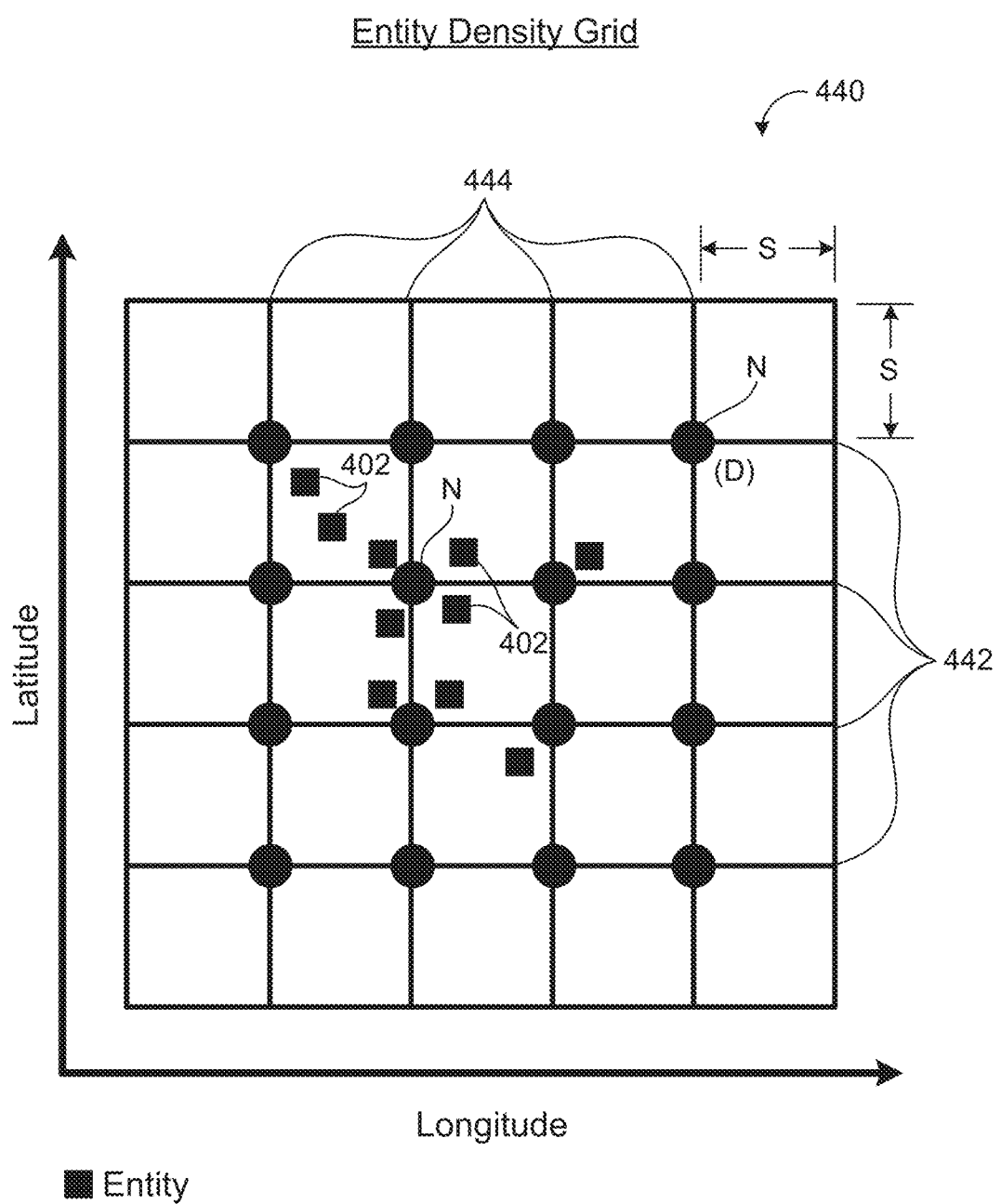
FIG. 4B is a schematic view of an example entity density grid.

Referring to FIG. 4A, the entity data store 420 includes a plurality of different entity records 430. Each entity record 430 may include data related to an entity 402 (FIG. 4B). The entity 402 can be any business or place with a geolocation (e.g., restaurants, bars, gas stations, supermarkets, movie theaters, doctor offices, parks, and libraries, etc.). An entity record 430 may include an entity identifier (ID) 432, an entity name 433, entity location data 336 (e.g., geolocation data), an entity category 438 (and optionally one or more sub-categories 438a-438n), and entity information 434.

The entity ID 432 may be used to identify the entity record 430 among the other entity records 430 included in the entity data store 420. The entity ID 432 may be a string of alphabetic, numeric, and/or symbolic characters (e.g., punctuation marks) that uniquely identifies the associated entity record 430. In some examples, the entity ID 432 describes the entity 402 in human readable form. For example, the entity ID 432 may include the name string of the entity 402 or a human readable identifying the entity 402. In some examples, the entity ID 432 includes a string in the format of a uniform resource locator (URL).

In a more specific example, if the entity record 430 describes a restaurant named Qdoba® (QDOBA is a registered trademark of Qdoba Restuarant Corporation), both the entity ID 432 and the entity name 433 for the entity record 430 can be "Qdoba." In an example where the entity ID 432 includes a string in human readable form and/or a URL, the entity ID 432 may include the following string "Qdoba, 42967 Woodward Avenue, Bloomfield Township, Mich. 48304" to uniquely identify the entity record 430. Other unique identifiers are possible as well, such as a store number.

The entity information 434 may include any information about the entity 402, such as text (e.g., description, reviews) and numbers (e.g., number of reviews). This information may even be redundant to other information contained in the entity record 430, but optionally structured for display, for example. The entity information 434 may include a variety of different types of data, such as structured, semi-structured, and/or unstructured data. Moreover, the entity information 434 may be automatically and/or manually generated based on documents retrieved from the data sources 130.

In some examples, the entity information 434 includes data that may be presented to the user 10 by an application 204 when the application 204 is set in the application state defined by the access mechanism(s) 202. For example, if one of the access mechanism(s) 202 is an application access mechanism 202a, the entity information 434 may be used in conjunction with the application state information 434 of a function record 330 to describe a state of the native application 204a after the user device 200 has performed the one or more operations indicated in the application access mechanism 202a.

The entity location data 436 may include data that describes a location of the entity 402. This data may include a geolocation (e.g., latitude and longitude coordinates), a street address, or any information that can be used to identify the location of the entity 402 within a geographical area. In some implementations, the entity location data 436 may define a geo-location associated with the function record 330.

The entity category 438 provides a classification or grouping of the entity 402. Moreover, the entity category can have one or more sub-categories to further classify the entity 402. For example, the entity record 430 could have an entity category 438 of "restaurant" and a sub-category 438a a type of cuisine, such as "French cuisine" or "contemporary." Any number of sub-categories 438a-438n may be assigned to classify the entity 402 for use during a search.

Referring to FIGS. 1B and 4B-4H, the entity system 400 includes an entity processing module 410 in communication with an entity data store 420. The entity processing module 410 determines a local entity density D (also referred to as "entity density") of entities 402 at different geographical locations. The search module 300 receives the local entity density D from the entity system 400 and may use the local entity density D when executing a search.

In some implementations, for a given entity category 438, such as a restaurant, the entity processing module 410 determines a local density D of entities 402 of that category 438 (e.g., restaurants) about a particular geolocation. Having a lot of entities 402 in a particular place or a few entities in a particular place may affect how the search module 300 conducts its search or generates search results 220. The search module 300 may filter function records 330 and/or score function records 330 based on the local entity density D. For example, if a user 10 is in New York City, the user 10 may likely want results that are closer in proximity to the user 10, than if the user 10 is in Montana, where entities 402 are generally more dispersed about a geographical area. In other implementations, the entity processing module 410 determines a local density D of entities 402 without any regard to the entity category 438. In other words, the entity processing module 410 may optionally use the entity category 438 when determining the local density D of entities 402.

Referring to FIG. 4B, the entity processing module 410 generates an entity density grid 440 (hereafter referred to as a density grid) of a geographical area. In some implementations, the density grid 440 includes latitude lines 442 and longitude lines 444 spaced by a common increment, such as 0.01 degree. The entity processing module 410 may initialize the density grid 440 with a latitude-longitude line spacing S based on the number of entities 402 in the general geographical area or a predetermined value associated with the geographical area. For example, a density grid 440 for New York, which is densely populated, may have a smaller latitude-longitude line spacing S than a density grid 440 for Montana, which is relatively much less densely populated. The entity density grid 440 includes nodes N at every intersection of the latitude and longitude lines 442, 444. As illustrated in the figures, the nodes N are regularly spaced on the latitude and longitude lines 442, 444; however, in other examples, the nodes N may be spaced at varying intervals. The geo-location of each node N is defined by a latitude value and a longitude value. Each node N has an entity density value D that indicates the number of entities 402 in the area surrounding the node N. The entity processing module 410 may store the entity density grid 440 (or pertinent data thereof) in the entity data store 420. In some examples, the entity processing module 410 stores map coordinates (i.e., latitude and longitude pairs) of the nodes N and the entity density values D associated with those coordinates (nodes N). Any coordinate not found in the entity data store 420 may have an assumed entity density value D of zero at search time. Moreover, one or more entity density values D may have a value of zero (e.g., when no entities 402 exist nearby).

A single entity 402 may contribute to one or more entity density values D at one or more nodes N. The entity density value D associated with a node N may be larger in areas where more entities 402 (e.g., businesses) are located. For example, entity density values D may be larger for downtown New York City, N.Y. than for Kearney, Nebr. The entity density D associated with anode N may be initialized to a value of 0. Subsequently, the entity density D may be increased based on the number of entities 402 in the area. The entity density D may be a decimal value in some examples. In other examples, the entity density value may be an integer.

Figure 4C:
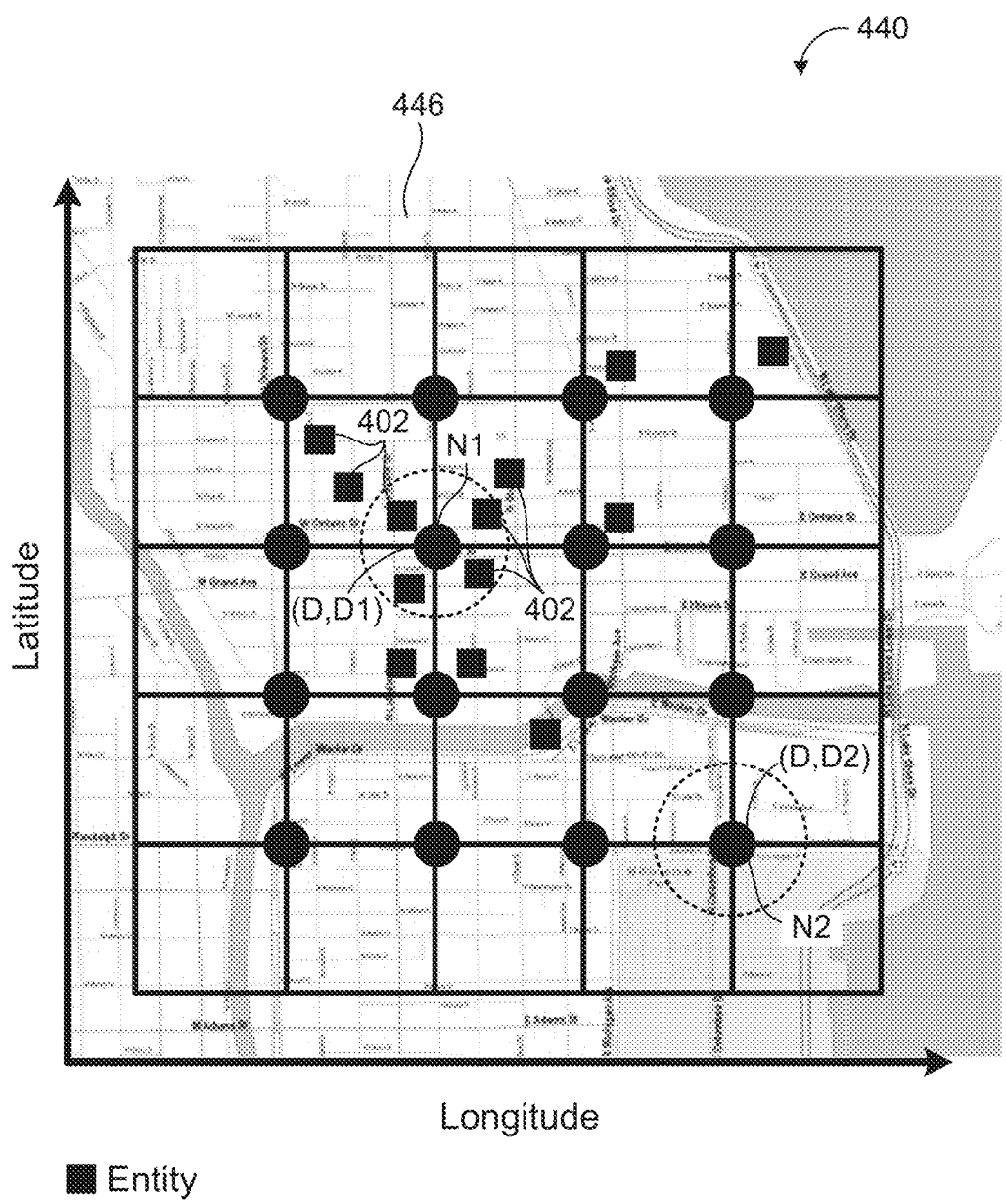
FIG. 4C is a schematic view of an example entity density grid overlain on a map.

FIG. 4C illustrates an example entity density grid 440 overlaid on a map 446 of a geographical area. The map 446 includes one or more entities 402 in their respective geolocations. In the example shown, there are more entities 402 about a first node N1 than a second node N2. Accordingly, in some examples, the entity processing module 410 may associate a higher local entity density D1 with the first node N1 than a local entity density D2 associated the second Node N2. In other examples, the entity processing module 410 increases the local entity density D1 with the first node N1 more than the local entity density D2 associated the second Node N2 or simply increases the local entity density D1 with the first node N1, while not changing the local entity density D2 associated the second Node N2. A "final" local entity density value D (e.g., an entity density value D after taking into account all entities 402 in the entity density grid 440) may be a sum of the contributions of individual entities 402. The entity processing module 410 may execute one or more different techniques for calculating entity densities D.

Figure 4D:
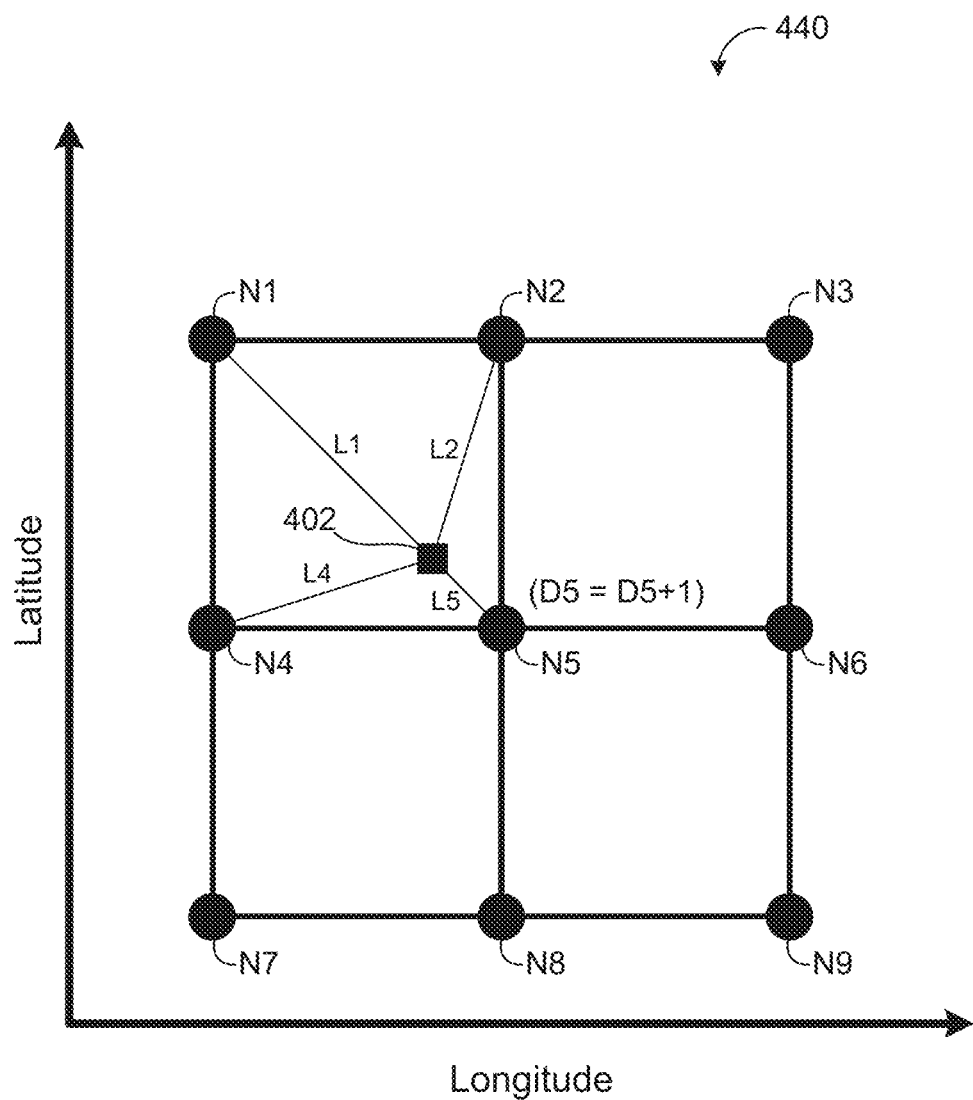
FIGS. 4D and 4E are schematic views illustrating attributing an entity density value to one or more nodes of an entity density grid.

FIG. 4D illustrates an example single point calculation executed by the entity processing module 410 to determine a local entity density D associated with a node N, N1-N9. The entity processing module 410, for each entity 402 in the entity density grid 440, calculates the entity density D at one or more nodes N. In some implementations, for each entity 402, the entity processing module 410 assigns a value (e.g., integer or decimal value) to the closest node N. In the example shown, the entity 402 has a location distance L5 to node N5 that is shorter than any other locations distances to L1, L2, L4 to other adjacent nodes N1, N2, N4. Accordingly, the entity processing module 410 assigns an entity density D5 to node N5, for example, by incrementing or increasing the entity density D5 associated with node N5. While the example illustrates incrementing the entity density D5 by an integer value, the entity density can also be increased by some other value, such as a weighted value. Moreover, the weighted value could be based on one or more of the location distances L1, L2, L4, L5.

Figure 4E:
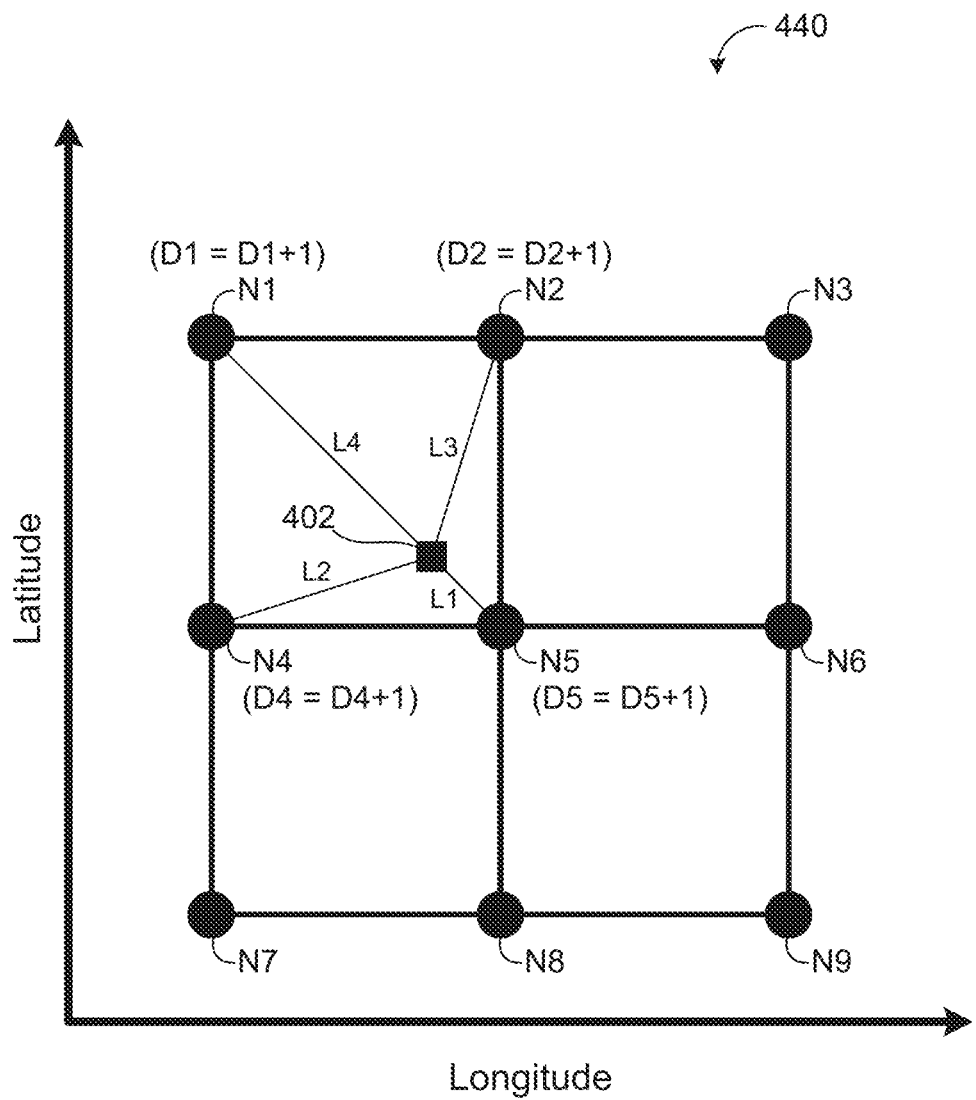

Referring to FIG. 4E, in some implementations, the entity processing module 410 increments or increases an entity density D associated with each node N near the entity 402. In the example shown, the entity processing module 410 increments or increases the entity densities D1, D2, D4, D5 of the adjacent nodes N1, N2, N4, N5 about the entity 402. Moreover, the entity processing module 410, in some examples, increases the entity densities D1, D2, D4, D5 of the adjacent nodes N1, N2, N4, N5 by weighted values based on the corresponding location distances L1, L2, L4, L5. For example, the entity processing module 410 may assign an entity density D to nodes N based on the distance of the nodes N to the entity 402. Closer nodes N may be assigned larger entity density values D. In FIG. 4C, node N5 is assigned the largest entity density D5, because its location distance L1 is the shortest distance. Meanwhile, node N1 is assigned a smaller entity density D1, because its location distance L1 is the longest distance. In these examples, the entity densities D assigned to the nodes N for a single entity 402 may be determined based on a function that yields smatter values as the distance increases (e.g., a decay function, such as a gradient decay function that provides an indication of entity density even in very low density areas). An example function includes the following equation.

$$D=1/(distance+1) \quad (1)$$

In some examples, entity density values D may be assigned to just those nodes N that immediately surround the entity 402 (e.g., nodes N1, N2, N4, N5). In other examples, entity density values D may be assigned to more distant nodes N than just the most immediate nodes that surround the entity 402.

Figure 4F:
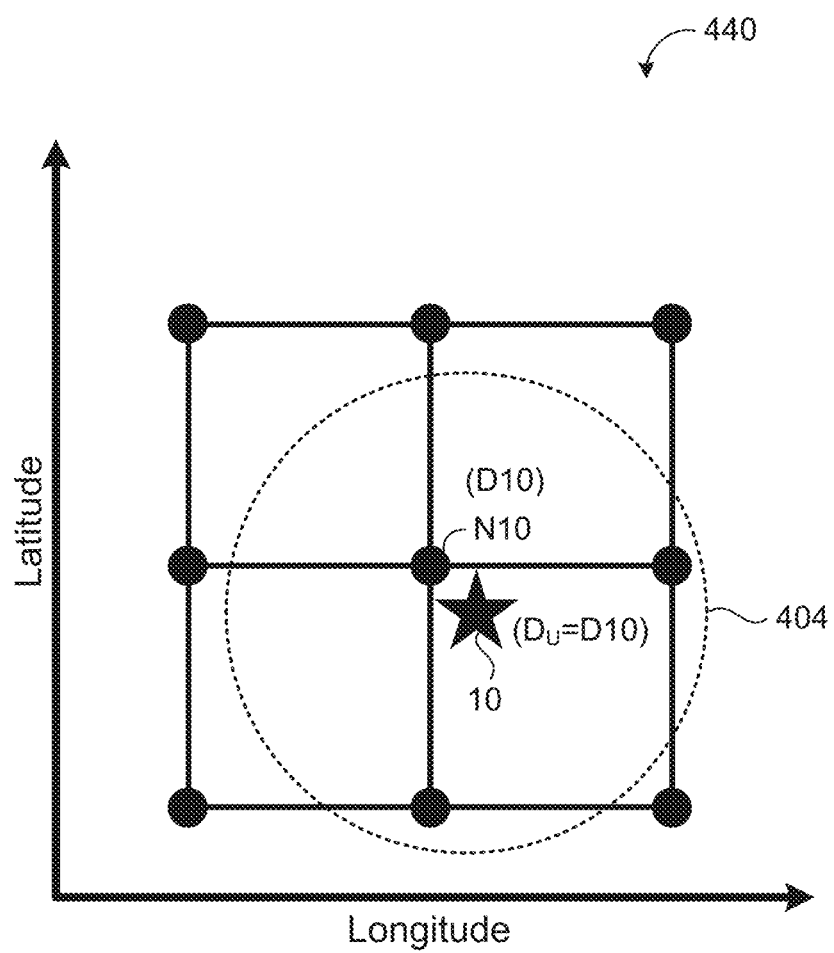
FIG. 4F is a schematic view of an example entity density grid having an identified location of a user device and an associated entity density value associated with the user device.

FIG. 4F illustrates assigning a user entity density $D_U$ to a user 10 based on a geolocation of the user 10. The entity system 400 receives the geolocation of the user 10 or location indicative data from the user device 200 (e.g., via the search system 300). For example, the query wrapper 210 may include the search query 212 and a geo-location or location indicative data of the user device 200 as determined by a GPS receiver of the user device 200. In some examples, the entity system 400 receives an Internet protocol GP) address from the user device 200 or a remote system 120 in communication with the user device 200. The search system 300 or the entity system 400 executes a look-up on the IP address and assigns a corresponding geolocation. For example, if the look-up result indicates that the user is in Mountain View, Calif., the search system 300 or the entity system 400 may assign a city center geolocation. In the example shown, based on the geolocation of the user 10, the entity processing module 410 identifies the user 10 as being located nearest to node N10. The entity processing module 410 may send the entity density value D10 associated with node N10 to the search module 300, which can filter and sort function records 330 and generate the search results 220 based on the received entity density D, D10.

An entity density value $D_U$ may be assigned to the user device 200 in other ways. In some examples, one or more entity density values D may be used by the entity processing module 410 to generate an entity density value $D_U$ for the user device 200. For example, the user device 200 may be assigned an entity density value $D_U$ that is based on the surrounding entity density values D, as weighted by the distance of the nodes N from the user device 200.

Figures 4G, 4H:
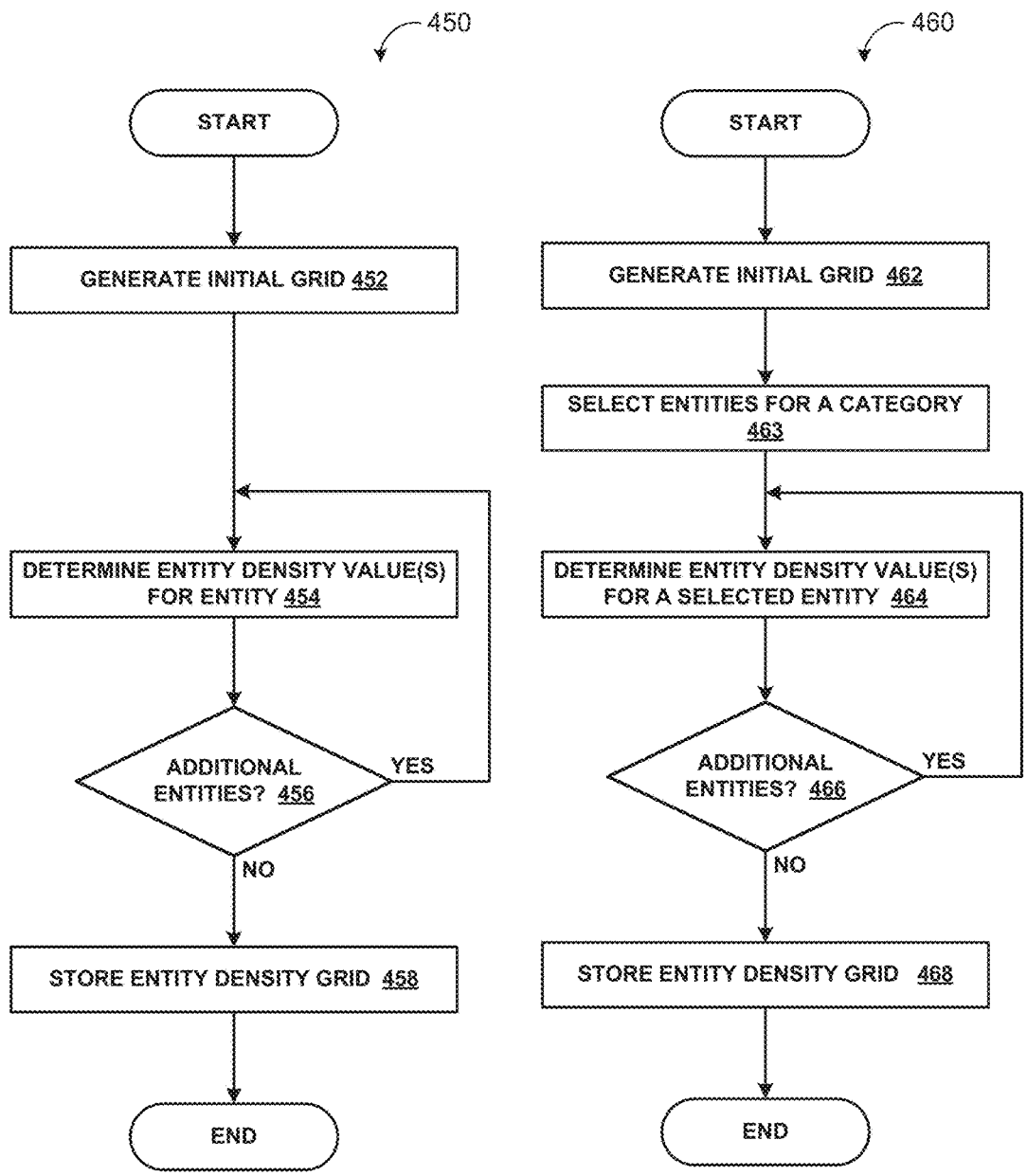
FIGS. 4G and 4H are schematic views illustrating example methods of generating an entity density grid.

FIGS. 4G and 4H provide exemplary arrangements of operations for methods 450, 460 of generating an entity density grid 440. FIG. 4G illustrates a general method 450 for all types of entities 402. FIG. 4H illustrates a method 460 directed to generating an entity density grid 440 for entities 402 of a single category 438 (e.g., restaurant entities, gas station entities, coffee shop entities).

In FIG. 4G, the method 450 includes, at block 452, generating an initial entity density grid 440. This may optionally include selecting a grid resolution and/or node dispersing (e.g., regular intervals or varied). This may also optionally include initializing the entity density values D associated with each node N (e.g., initializing to zero). The method 450 includes, at block 454, for each entity 402, determining the entity density values D for one or more nodes N. In other words, the method 450 includes determining the entity density values D for one or more nodes N in the density grid 440 while iterating one entity 402 at a time until all the entities 402 have been accounted for, by determining, at block 456, if a next unprocessed entity 402 exists in the entity data store 420 or a subset of entities 402 in the data store 420 that reside in the entity density grid 440. In some implementations, the method 450 includes assigning an entity density D to one node N (e.g., a closest node N to the entity 402); while in other implementations, the method 450 includes assigning an entity density D to multiple nodes N about the entity 402 (e.g., based on location distance between the entity 402 and the nodes N). The method further includes, at block 458, storing the entity density grid 440 in the entity data store 420 or other non-transitory memory or storage for later use (e.g., filtering and/or scoring during search).

In FIG. 4H, the method 460 includes, at block 462, generating an initial entity density grid 440, which may optionally include selecting a grid resolution and/or node dispersing (e.g., regular intervals or varied). This may also optionally include initializing the entity density values D associated with each node N (e.g., initializing to zero). The method 450 includes, at block 463, selecting entities 402 for a specific category 438 and using the selected entities 402 to make a category-specific entity density grid 440. For example, the method 460 may include selecting all entities 402 for the restaurant category 438. The method 450 includes, at block 464, for each entity 402, determining the entity density values D for one or more nodes N (e.g., as discussed above) while iterating one selected entity 402 at a time until all the selected entities 402 have been accounted for by determining, at block 466, if a next entity 402 exists in a list of selected entities 402. The method further includes, at block 468, storing the entity density grid 440 in the entity data store 420 or other non-transitory memory or storage for later use (e.g., filtering and/or scoring during search). There could be multiple different entity density grids of different categories/subcategories.

Figure 5A:
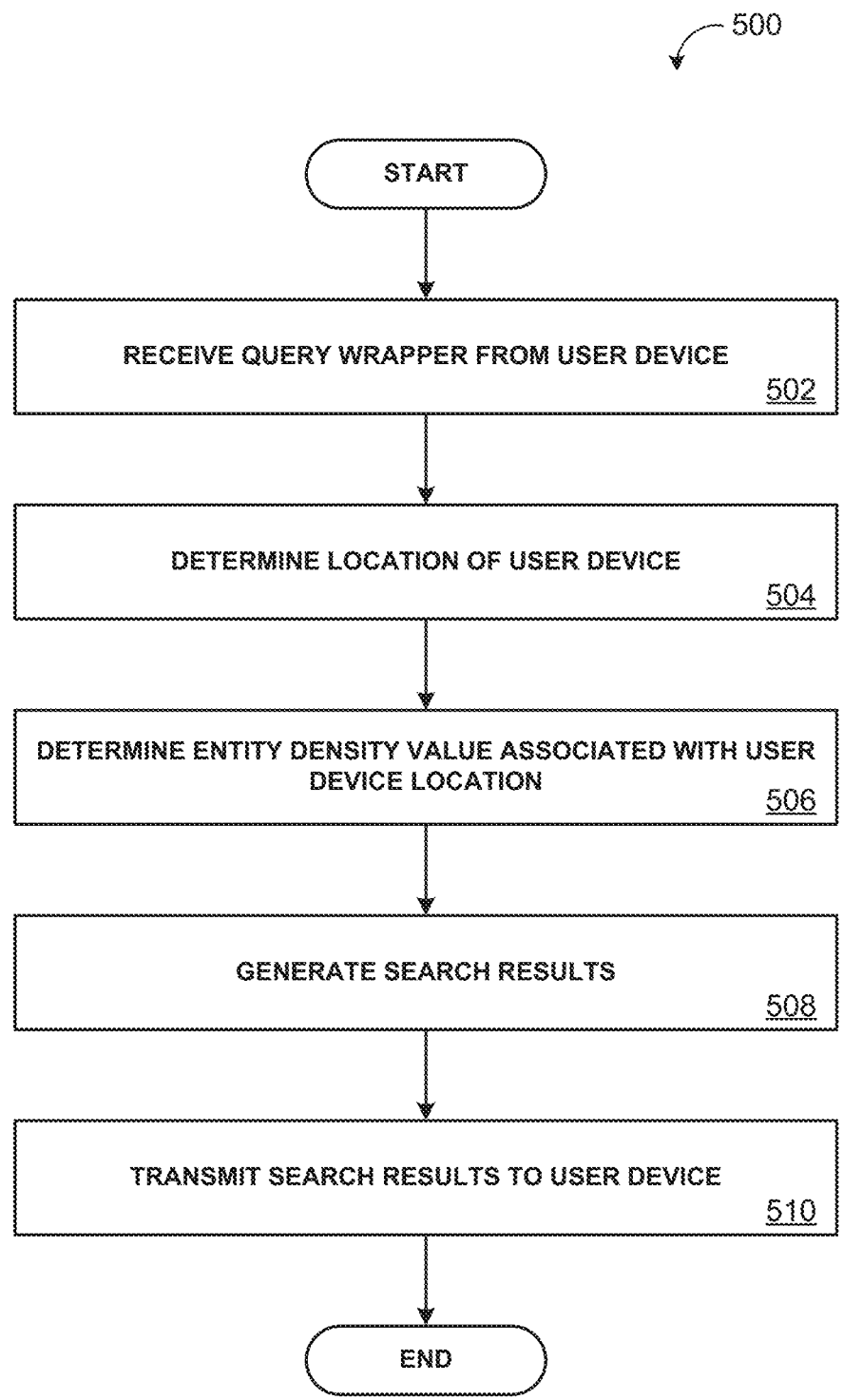
FIGS. 5A and 5B are schematic views illustrating example methods of performing a location-based search.
Figure 5B:
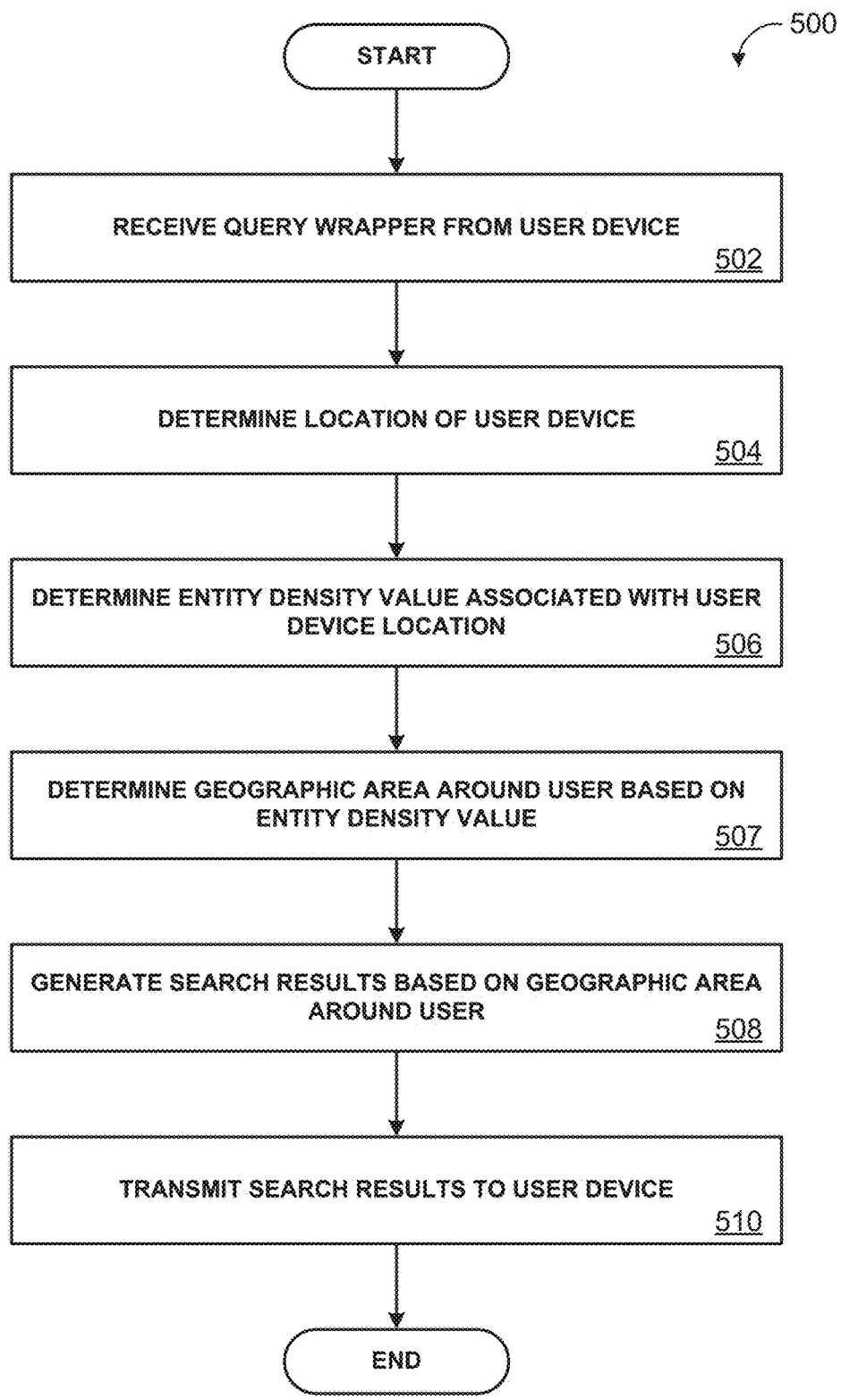

FIGS. 5A and 5B provide example arrangements of operations for a method 500 of performing a location-based search. The method 500 is described with respect to the user device 200, the search system 300, the search module 310, the entity system 400, and the entity module 410 as illustrated in FIG. 2. In block 502, the search module 310 receives the query wrapper 210. In block 504, the search module 310 determines the geographic location (i.e., geo-location) of the user device 200 based on data included in the query wrapper 210.

In some examples, the search module 310 may determine the geo-location of the user device 200 in terms of latitude and longitude values that indicate the latitude and longitude of the user device 200. The search module 310 may determine the geo-location of the user device 200 in terms of an address, such as a postal address (e.g., a street address, zip code, and/or city name). The geo-location of the user device 200 determined by the search module 310 may be a point location (e.g., a latitude/longitude or a postal address). The user device 200 may generate geo-location data 218 (e.g., latitude and longitude) and the query wrapper 210 including the geo-location data 218. In some examples, the search module 310 determines the geo-location of the user device 200 based on data (e.g., an IP address 228) included in the query wrapper 210. For example, the search module 310 may look up the location of the user device 200 using the IP address 228. The search module 310 may communicate with a remote server 110 that can provide geo-location data for the user device 200 based on the IP address 228.

At block 506, the method 500 includes determining the entity density value D. The search module 310 determines the entity density value D associated with the user device 200, for example, by communicating with the entity system 400, and in particular, the entity processing module 410. The entity processing module 410 receives the geo-location data 218, as supplied by the query wrapper 210, from the search module 310, determines an entity density value D associated with a geo-location and transmits the entity density value D back to the search module 310. The entity processing module 410 may generate an entity density grid 440 and determine the entity density value D associated with the geo-location of the user device 200 using the techniques described above.

In the example shown in FIG. 5B, the method 500 includes, at block 507, determining a geographical area 404 (FIG. 4F) around the user 10 based on the entity density value D. The size of the area 404 may be inversely proportional to the entity density value D. Moreover, while a circle is shown, the shape of the area 404 can be any geometric shape. For example, the search module 310 may circumscribe a relatively smaller area 404 about the user 10 for a relatively large entity density value D and vice-versa.

For example, the search system 300 may filter out entities 402 located outside of the geographic area 404. This is a "hard fitter" scenario. In other examples, the search system 300 uses the geographic area 404 to determine a relevance score 226 (i.e., a relevance of the search results 220 to the search query 212). In some examples, the search system 300 scores a search result 220 based on whether the entity 402 is located within the geographic area 404 or outside of the geographic area 404 (e.g., higher scores inside of area 404 than outside). This can be implemented in a 0/1 scoring feature indicating inside/outside. It could also be implemented as a weighting factor for the relevance. Other scoring strategies could also be implemented, such as scoring based on how far outside the geographic area 404 the entity 402 is located.

In some scenarios, the search system 300 may generate a smaller geographic area 404 for a greater entity density value D. In this scenario, the search results 220 returned to the user 10 may be for places that are closer to the user 10. In a more densely populated area 404, it is assumed that the user 10 would more likely desire entities 402 that are relatively close to the user 10. If the entity density value D is smaller, the geographic area 404 around the user 10 may be enlarged. The search system 300 uses the assumption that in a less densely populated area, the entities 402 will tend to be located farther from the user 10.

The geographic area 404 may be a geometric shape such as a circle or rectangle. In the example where the geometric shape is a circle, the search system 300 may modify a radius value to modify the size of the geographic area 404. In the case of a rectangle, the search system may modify a width/length to modify the size of the geographic area 404.

At block 508, the method 500 includes generating the search results 220. The search system 300 (e.g., in particular, the search module 310) may generate the search results 220 based on the entity density value D. In some implementations, as shown in FIG. 5B, the search module 310 generates the search results 220 based on the determined geographical area 404 around the user 10, which is based on the entity density value D. The search module may use the area 404 to filter search results 220.

Finally, at block 510, the method 500 includes transmitting the search results 220 to the user device 200. The search module 310 may deliver the search results 220, which can include access mechanisms 202, results scores 226, and/or link data 232.

Figure 6:
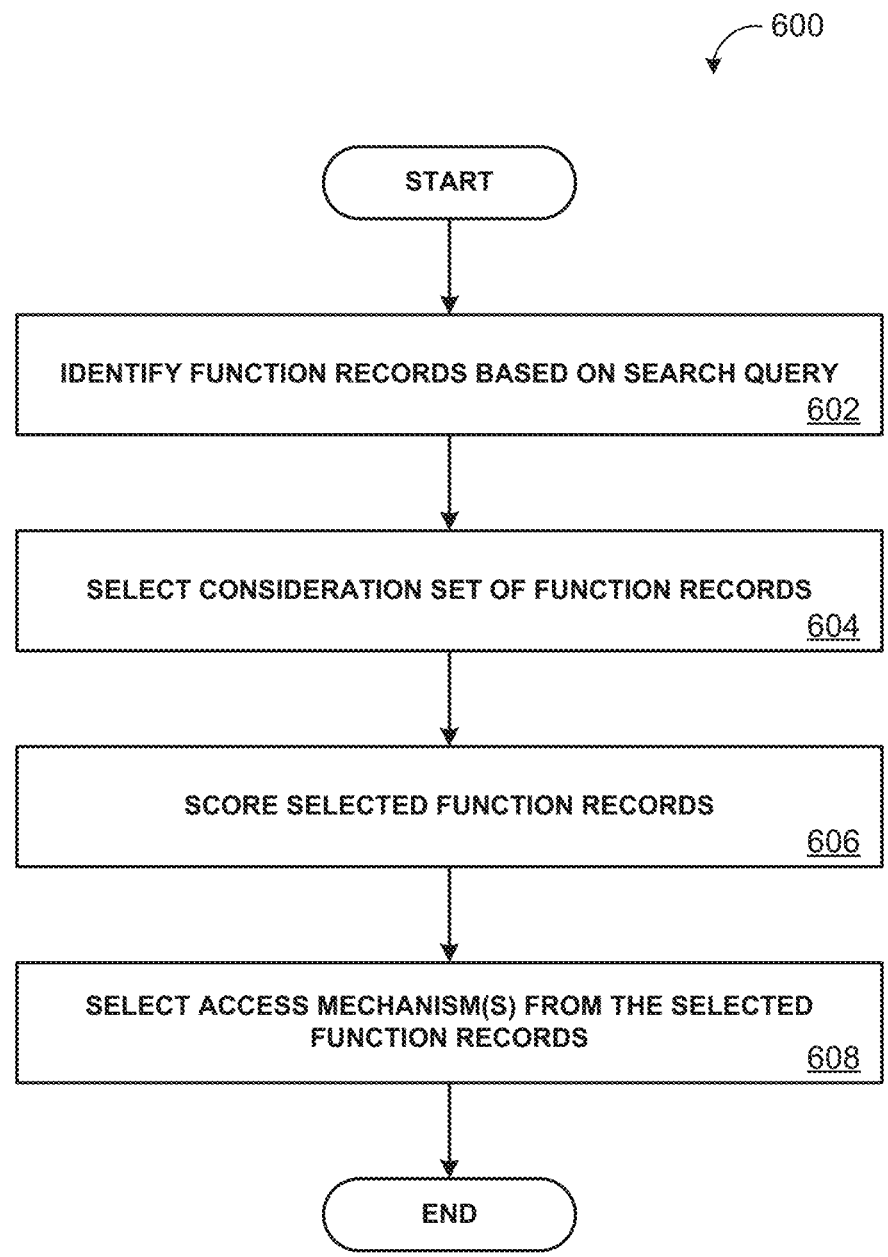
FIG. 6 is a schematic view illustrating an example method of generating search results.

FIG. 6 provides an example arrangement of operations for a method 600 of generating search results (e.g., at block 508). The method 600 is described with respect to the user device 200, the search module 310, and the data store 320 as illustrated in FIG. 2.

At block 602, the method 600 includes identifying function records 330 based on a search query 212. The search module 310 identifies function records 330 in the search data store 320 based on the search query 212 received in the query wrapper 210. The search module 310 may execute the search based on the geo-location data 218 and/or a geographical area 404 about the user device 200. For example, the search module 310 may identify function records 330 in the data store 320 by detecting search term matches between terms (i.e., words) of the search query 212 and terms included in the application state information of the function records 330. Some, or all, of the function records 330 identified in block 506 may include location data 336 that the search module 310 may use to filter and/or score the function records 330. Moreover, the entity system 400 may supply the location data 336 of the function record 330. If location data 218, 336 is not available, the search module 310 can execute its search without use of location of the user device 200 or entities 402 about the user device 200. In situations where location data 218, 336 is not available, the search module 310 may estimate a location of the user device 200 using information in the search query 212. For example, if the user searches for an entity 402, such as ZINGERMAN'S® (a registered trademark of Zingerman's Delicatessen), which is only located in Ann Arbor, Mich., the search system 300 may estimate a location of the user 10 at the city center, of Ann Arbor, Mich. or on Main street of Ann Arbor, Mich.

At block 604, the method 600 includes selecting a consideration set 350 of function records 330. The search module 310 selects a set 350 of function records 330 from those function records 330 identified at block 602. The selected set 350 of function records 330 may be referred to as a "consideration set" of function records 330 and/or function identifier 332 of those function records 330. The search module 310 may score the consideration set 350 of function records 330 and include information from the consideration set 350 of function records 330 in the search results 220. The search module 310 may filter the consideration set 350 of function records 330 based on the entity density value D, or more specifically, a geographical area 404 determined by the search module 310, based on the entity density value D.

Figure 8:
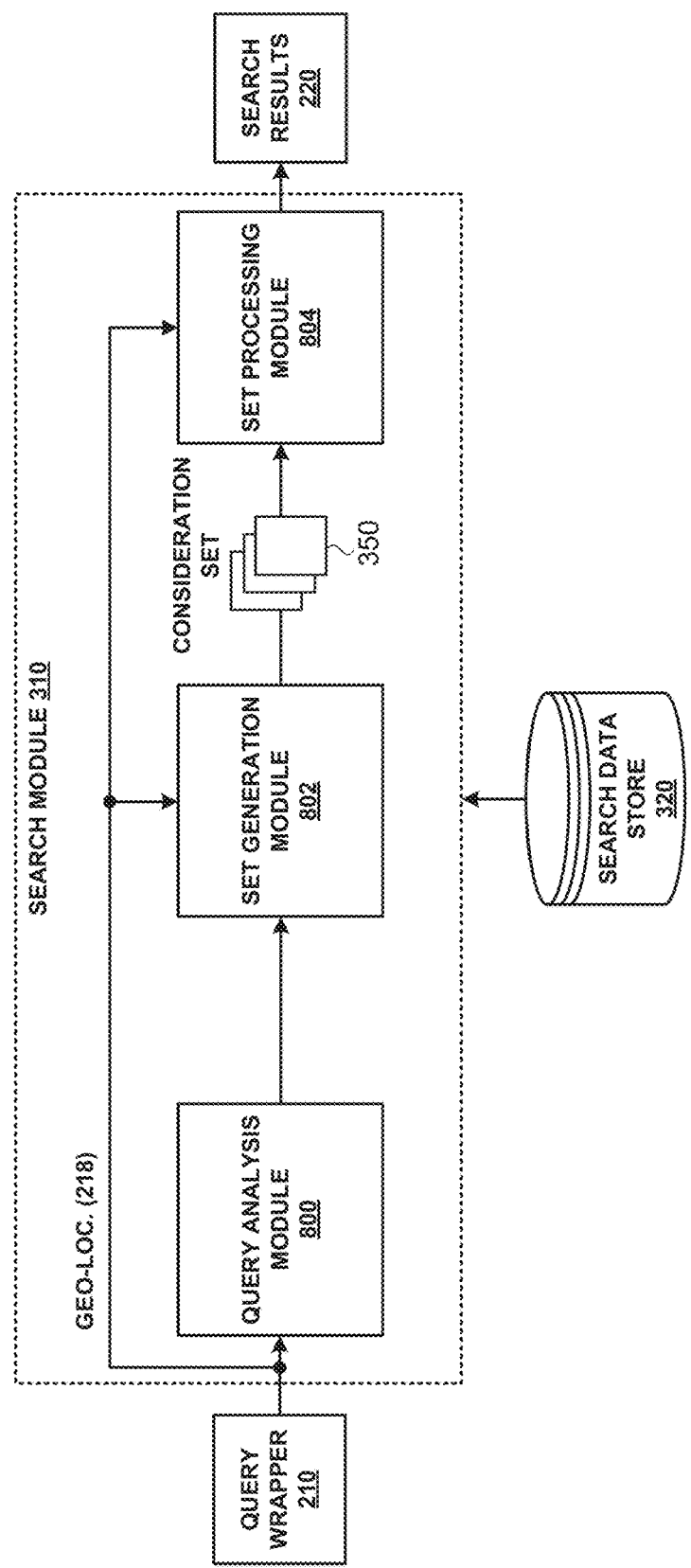
FIG. 8 is a functional block diagram of an example search module.

For example, the search module 310 may select function records 330 having locations that are inside of the geographic area 404 around the user device 200. In some examples, the consideration set 350 is not filtered. In these examples, all of the function records 330 of the consideration set 350 are scored by the search module 310 (e.g., the set processing module 804 (FIG. 8). The scoring can be done based on whether the entity 402 is located within the geographic area 404 around the user device 200 and even where the entity 402 is located relative to the geographic area 404 (e.g., inside/outside or how far inside/outside of the geographical area 404). In additional implementations, the entity density D assigned to a user 10 is used for scoring the function records 330.

At block 606, the method 600 includes scoring the consideration set 350 of function records 330. For example, the search module 310 may generate a score (e.g., a result score 226) for each of the function records 330 that indicates the relevance of the function record 330 to the search query 212.

At block 608, the method 600 includes selecting one or more access mechanisms 202 from the function records 330 for transmission in the search results 220. For example, the search module 310 may select access mechanisms 202 from the function records 330 associated with the largest result scores 226 determined at block 606. In some implementations, the search module 310 determines which access mechanisms 202 are compatible with the user device 200 based on the platform data 222. In these implementations, the search module 310 may transmit a subset of the access mechanisms 202 from the selected function records 330 which are compatible with the user device 200 (e.g., based on OS version, web browser version, and/or device type).

Figure 7:
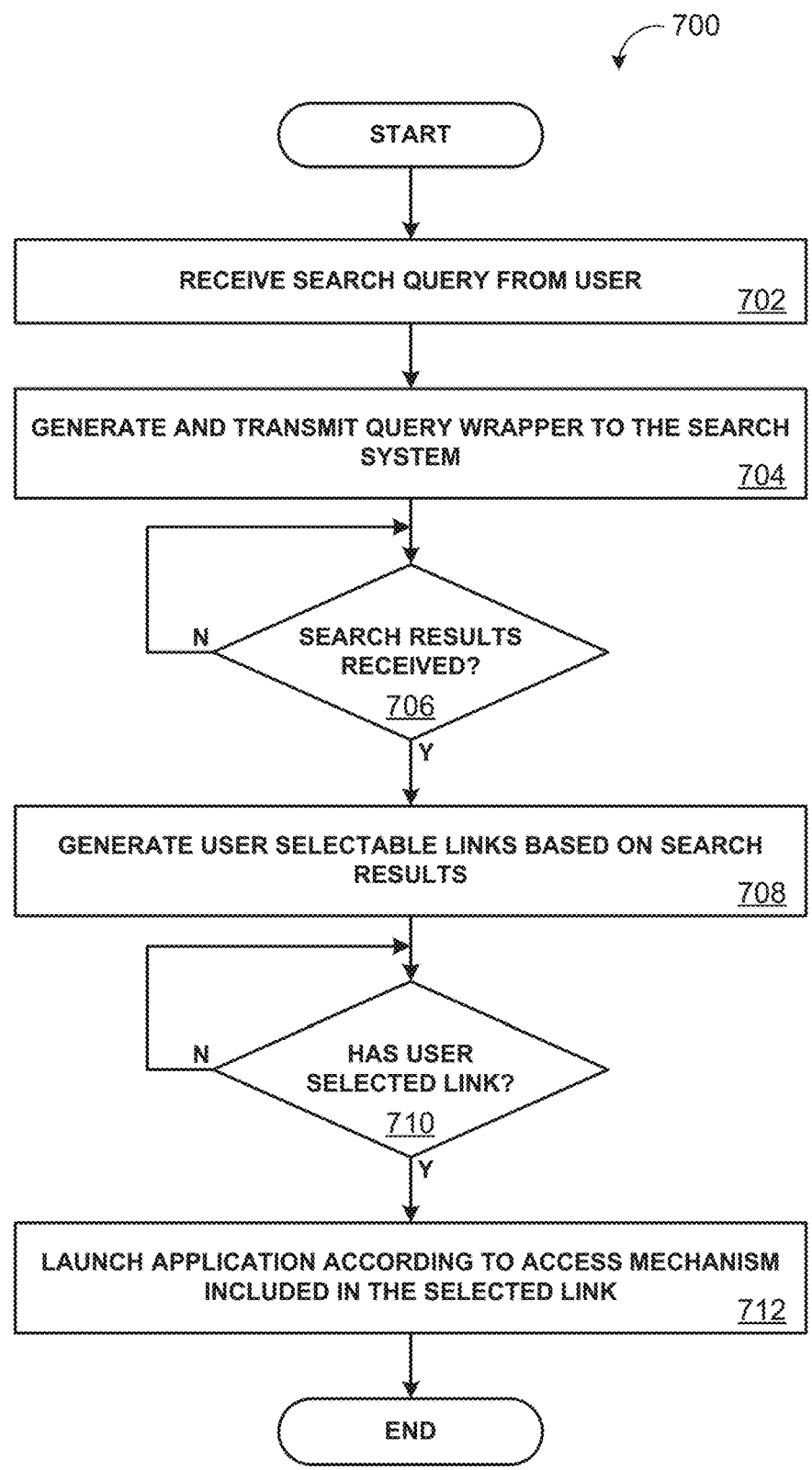
FIG. 7 is a flow diagram illustrating an example method describing operation of a user device.

FIG. 7 provides an example arrangement of operations for a method 700 of operating a user device 200. It may be assumed that the user device 200 described according to the method 700 includes a search application 216 (e.g., a native application 204a or web-browser application 204b) configured to communicate with the search system 300.

At block 702, the method 700 includes receiving a search query 210 from a user 10. In some implementations, the search application 216 executing on the user device 200 receives the search query 212 from of the user 10. At block 704, the method includes generating and transmitting query wrapper 210 to the search system 300. In some implementations, the user device 200 generates and transmits the query wrapper 210 to the search system 300. At block 706, the method 700 includes waiting for receipt of the search results 220. For example, the user device 200 waits for receipt of the search results 220 from the search system 300. The method 700 continues to block 708 when the user device 200 receives the search results 220 from the search system 300. The search results 220 may include a list of access mechanisms 202 and optionally result scores 226 associated with the access mechanisms 202. Additionally, the search results 220 may optionally include link data 230 (e.g., text and/or images) for the access mechanisms 202. The search application 216 may generate user selectable links 230 in the GUI 240 based on the received link data 230.

At block 708, the method 700 includes generating user selectable links 230 based on the search results 220. The search application 216 may generate the user selectable links 230. At block 710, the method includes waiting for a user selection of a link 230. The search application 216 may wait for the user 10 to select one of the user selectable links 230 before operation proceeds to block 712. When the user 10 selects (e.g., touches) one of the links 230, the method 700 includes launching an application 204 associated with the link 230. For example, in response to selection of a link 210 including an access mechanism 202, the user device 200 launches the application 204 referenced in the access mechanism 202 and performs one or more operations indicated in the access mechanism 202 in block 712.

FIG. 8 shows an example search module 310 that includes a query analysis module 800, a consideration set generation module 802 (hereinafter "set generation module 802"), and a consideration set processing module 804 (hereinafter "set processing module 804"). The query analysis module 800 receives the query wrapper 210 and analyzes the received search query 212. The query analysis module 800 may perform various analysis operations on the received search query 212, which may include, but are not limited to, tokenization of the search query 212, filtering of the search query 212, stemming, syncronization, and stop word removal. In some implementations, the query analysis module 800 detects a query-specified location included in the search query 212.

The set generation module 802 identifies a plurality of function records 330 based on the received search query 212. In some examples, the set generation module 802 identifies the function records 330 based on matches between terms of the search query 212 and terms in the function records 330. For example, the set generation module 802 may identify the function records 330 based on matches between tokens generated by the query analysis module 800 and words included in the function records 330, such as words included in the function IDs 332 and/or the application state information 334.

The set generation module 802 may then determine a search location to use for generation of a consideration set 350 of function records 330. If the query analysis module 800 determines that the search query 212 does not include a location, the set generation module 802 may set the search location to the location of the user device 200, as determined based on other data included in the query wrapper 210, such as geo-location data indicating latitude and longitude of the user device 200.

The consideration set 350 of function records 330 may refer to the function records 330 that are to be scored by the set processing module 804. The set generation module 802 may determine the geo-location of the user device 200 based on data included in the query wrapper 210. In additional examples, if the query analysis module 800 detects a query-specified location, the set generation module 802 uses the query-specified location as the search location. In some examples, the set generation module 802 uses the geo-location of the user device 200 as the search location (e.g., to filter function records 330 based on location). Moreover, the set generation module 802 may optionally determine a geographical area 404 (of any shape) about the geo-location of the user device 200 and use the area 404 for filter out function records 330 not within or about the area 404. The set generation module 802 may execute a hard filter that excludes function records 330 not within the area 404, weight/score function records 330 within the area 404, and/or attribute a greater significance to function records 330 within the area 404.

The set processing module 804 may score the function records 330 in the consideration set 350 in order to generate a set of search results 220. The scores 226 associated with the function records 330 may be referred to as "result scores." The set processing module 804 may determine a result score 226 for each of the function records 330 in the consideration set 350. The result scores 226 associated with a function record 330 may indicate the relative rank of the function record 330 (e.g., by the access mechanisms 202) among other function records 330. For example, a larger result score 226 may indicate that a function record 330 is more relevant to the received search query 212. Moreover, a larger result score 226 or some component of the result score 226 may indicate a proximity of an entity 402 associated with the function record 330 to the geo-location of the user device 200 or that the entity 402 associated with the function record 330 is within the determined geographical area 404 of the user device 200.

The information conveyed by the search results 220 may depend on how the result scores 226 are calculated by the set processing module 804. For example, the result scores 226 may indicate the relevance of an application function or application state to the search query 212, the popularity of an application function or state, or other properties of the application function or state, depending on what parameters the set processing module 804 uses to score the function records 330.

The set processing module 804 may generate result scores 226 for function records 330 in a variety of different ways. In some implementations, the set processing module 804 generates a result score 226 for a function record 330 based on one or more scoring features. The scoring features may be associated with the function record 330 and/or the search query 212. A function record scoring feature (hereinafter "record scoring feature") may be based on any data associated with a function record 330. For example, record scoring features may be based on any data included in the application state information 334 of the function record 330. Example record scoring features may be based on metrics associated with a person, place, or thing described in the function record 330. Example metrics may include the popularity of a place described in the function record 330 and/or ratings (e.g., user ratings) of the place described in the function record 330. For example, if the function record 330 describes a song, a metric may be based on the popularity of the song described in the function record 330 and/or ratings (e.g., user ratings) of the song described in the function record 330. The record scoring features may also be based on measurements associated with the function record 330, such as how often the function record 330 is retrieved during a search and how often access mechanisms 202 of the function record 330 are selected by a user 10. Record scoring features may also be based on whether the function record 330 includes an application access mechanism 202 that leads to a default state or a deeper native application state 204a.

A query scoring feature may include any data associated with the search query 212. For example, query scoring features may include, but are not limited to, a number of words in the search query 212, the popularity of the search query 212, and the expected frequency of the words in the search query 212. A record-query scoring feature may include any data generated based on data associated with both the function record 330 330 and the search query 212 that resulted in identification of the function record 330 by the set generation module 802. For example, record-query scoring features may include, but are not limited to, parameters that indicate how well the terms of the search query 212 match the terms of the application state information 334 of the identified function record 330. The set processing module 804 may generate a result score 226 for a function record 330 based on at least one of the record scoring features, the query scoring features, and the record-query scoring features.

The set processing module 804 may determine a result score 226 based on one or more of the scoring features listed herein and/or additional scoring features not explicitly listed. In some examples, the set processing module 804 may include one or more machine learned models (e.g., a supervised learning model) configured to receive one or more scoring features. The one or more machine learned models may generate result scores 226 based on at least one of the record scoring features, the query scoring features, and the record-query scoring features. For example, the set processing module 804 may pair the search query 212 with each function record 330 and calculate a vector of features for each (query, record) pair. The vector of features may include one or more record scoring features, one or more query scoring features, and one or more record-query scoring features. The set processing module 804 may then input the vector of features into a machine-learned regression model to calculate a result score for the function record 330. In some examples, the machine-learned regression model may include a set of decision trees (e.g., gradient boosted decision trees). In another example, the machine-learned regression model may include a logistic probability formula. In some examples, the machine learned task can be framed as a semi-supervised learning task, where a minority of the training data is labeled with human curated scores and the rest are used without human labels.

The result scores 226 associated with the function records 330 (e.g., access mechanisms 202) may be used in a variety of different ways. The set processing module 804 and/or the user device 200 may rank the access mechanisms 202 based on the result scores 226 associated with the access mechanisms 202. In these examples, a larger result score may indicate that the access mechanism 202 (e.g., the function or application state) is more relevant to a user than an access mechanism 202 having a smaller result score. In examples where the user device 200 displays the search results 220 as a list, the user device 200 may display the links 230 for access mechanisms 202 having larger result scores 226 nearer to the top of the results list (e.g., near to the top of the screen). In these examples, the user device 200 may display the links 230 for access mechanisms 202 having lower result scores 226 farther down the list (e.g., off screen).

In some implementations, the set processing module 804 scores function records 330 based on relevance to the search query 212. The relevance may be quantified in terms of a level key word matching, location data matching, or a combination thereof. For example, if a user searches for McDonald's® (MCDONALD'S is a registered trademark of the McDonald's Corporation) from a user device 200 having a geo-location corresponding to Main Street, Rochester Hills, Mich., the relevance of a function record 330 having entity location data 336 corresponding to the McDonald's located at 808 S. Rochester Rd., Rochester, Mich. 48307 is very high, if not the highest, since that McDonald's location would be the closest to the user device 200. Moreover, since Rochester Hills, Mich. is only moderately populated with entities 402 (i.e., restaurants, in this example) the entity density value D would be moderate, indicating the user 10 would likely be willing to drive anile up the road to visit that McDonald's. If, on the other hand, there were no McDonald's within a geographical area 404 (e.g., a 5-10 mile radius) about the user device 200, the set processing module 804 scores function records 330 may score function records 330 corresponding to other entities 402 having the same or similar entity categories 438 or sub-categories 438a (e.g., restaurant/fast food/burgers) higher than other function records 330 associated with entities 402 having different entity categories 438 or sub-categories 438a.

Although function records 330 in the search data store 320 may include entity location data 336, some function records 330 in the search data store 320 may not include entity location data 336. For example, a function record 330 may not include entity location data 336 when the function record 330 is associated with a function that is not specific to a geographic location. The search module 310 of the present disclosure may be configured to return search results 220 that include access mechanisms 202 which are not associated with location data.

Modules and data stores included in the search system 300 represent features that may be included in the search system 300 of the present disclosure. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

In some implementations, the search system 300 may be a system of one or more computing devices (e.g., a computer search system) that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the search system 300 may also include various human interface devices, including, but not limited to, display screens, keyboards, pointing devices (e.g., a mouse), touchscreens, speakers, and microphones. The computing devices may also be configured to communicate with additional devices, such as external memory (e.g., external HDDs).

The one or more computing devices of the search system 300 may be configured to communicate with the network 120. The one or more computing devices of the search system 300 may also be configured to communicate with one another (e.g., via a computer network). In some examples, the one or more computing devices of the search system 300 may include one or more server computing devices configured to communicate with user devices (e.g., receive query wrappers and transmit search results), gather data from data sources 130, index data, store the data, and store other documents. The one or more computing devices may reside within a single machine at a single geographic location in some examples. In other examples, the one or more computing devices may reside within multiple machines at a single geographic location. In still other examples, the one or more computing devices of the search system 300 may be distributed across a number of geographic locations.

Figure 9:
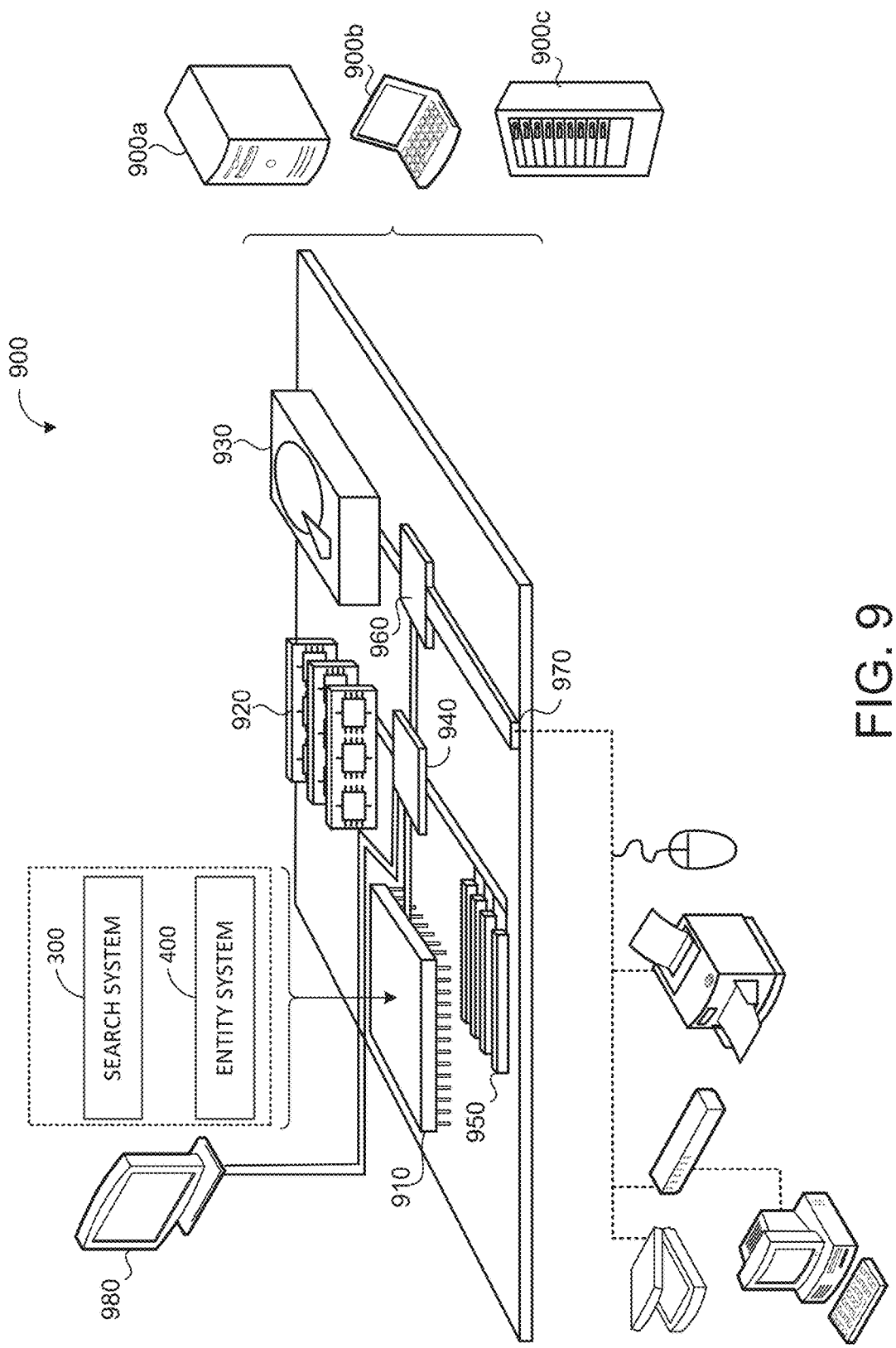
FIG. 9 is a schematic view of an example computing device executing any systems or methods described herein.

FIG. 9 is schematic view of an example computing device 900 that may be used to implement the systems and methods described in this document. The computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 900 includes a processor 910, memory 920, a storage device 930, a high-speed interface/controller 940 connecting to the memory 920 and high-speed expansion ports 950, and a low speed interface/controller 960 connecting to low speed bus 970 and storage device 930. Each of the components 910, 920, 930, 940, 950, and 960, are interconnected using various busses, and may be mounted on a common motherboard or in other manners as appropriate. The processor 910 can process instructions for execution within the computing device 900, including instructions stored in the memory 920 or on the storage device 930 to display graphical information for a graphical user interface (GUI) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 920 stores information non-transitorily within the computing device 900. The memory 920 may be a computer-readable medium, a volatile memory unit(s), or non-volatile memory unit(s). The non-transitory memory 920 may be physical devices used to store programs (e.g., sequences of instructions) or data (e.g., program state information) on a temporary or permanent basis for use by the computing device 900. Examples of non-volatile memory include, but are not limited to, flash memory and read-only memory (ROM)/programmable read-only memory (PROM)/erasable programmable read-only memory (EPROM) electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (KM) as well as disks or tapes.

The storage device 930 is capable of providing mass storage for the computing device 900. In some implementations, the storage device 930 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages bandwidth-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 950, which may accept various expansion cards (not shown). In some implementations, the low-speed controller 960 is coupled to the storage device 930 and low-speed expansion port 970. The low-speed expansion port 970, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 900*a* or multiple times in a group of such servers 900*a*, as a laptop computer 900*b*, or as part of a rack server system 900*c*.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method for providing content to a user device in an electronic device, comprising:
   in response to receiving a search criteria and location data from the user device, identifying, by a processor of the electronic device, a user location based on the location data;
   generating, by the processor, an entity density grid for a geographical area, wherein the entity density grid has one or more nodes, wherein the entity density grid includes a plurality of cells formed by latitude lines and longitudinal lines;
   identifying, by the processor, a first entity density value for each of the one or more nodes included in the entity density grid, wherein the one or more nodes are intersections of the entity density grid, wherein the first entity density value for each of the one or more nodes is a total number of entities included in four cells surrounding a corresponding node from among the plurality of cells;
   identifying, by the processor, a second entity density value for each of the one or more nodes by increasing the first entity density value for each of the one or more nodes based on locations of the entities with respect to each of the one or more nodes;
   identifying, by the processor, a geographical density of entities corresponding to the user location as a second entity density value of a closest node to the user location;
   selecting, by the processor, one or more access mechanisms based on the search criteria and the geographical density, each access mechanism, when executed by the user device, causes the user device to access a resource identified by the access mechanism; and transmitting, by the processor via a communication circuitry of the electronic device, search results including the one or more selected access mechanisms to the user device.

2. The method of claim 1, wherein the location data indicates a location of the user.

3. The method of claim 2, wherein the location data includes a geo-location.

4. The method of claim 1, wherein identifying the second entity density value for each of the one or more nodes comprises:
for each entity located within the entity density grid, increasing, by the processor, a first entity density value of a node closest to each entity.

5. The method of claim 4,
wherein a degree of increase for the first entity density value of the node closest to each entity is identified based on a distance between each entity and the node closest to each entity.

6. The method of claim 1, further comprising:
filtering, by the processor, access mechanisms based on the user location.

7. The method of claim 6, further comprising:
filtering out, by the processor, access mechanisms corresponding to entities located outside a geographical boundary about the user location.

8. The method of claim 7, wherein each of a size of the geographical boundary and a shape of the geographical boundary is based on the geographical density of entities.

9. The method of claim 1, wherein the selecting of the one or more access mechanisms comprises:
generating, by the processor, a consideration set of function records based on the search criteria, each function record having an associated access mechanism, application state information, and an entity location; and
scoring, by the processor, the consideration set of function records based on the associated entity location with respect the user location and a correspondence of the application state information to the search criteria.

10. The method of claim 1, wherein the selecting of the one or more access mechanisms comprises:
generating, by the processor, a consideration set of function records based on the search criteria, each function record having an associated access mechanism and an entity location;
identifying, by the processor, a geographical boundary about the user location based on the geographical density of entities; and
filtering out, by the processor, function records from the consideration set having an associated entity location outside the geographical boundary.

11. The method of claim 1, wherein the access mechanism, when executed by the user device, causes the user device to:
access a native application installed on the user device;
launch a web browser installed on the user device and access a web resource identified by the access mechanism; or
access a digital distribution platform and download an application identified by the access mechanism.

12. The method of claim 1, wherein each of the one or more access mechanisms specifies a state of an application.

13. An electronic device providing content to a user device, comprising:
a communication circuitry; and
a processor configured to:
in response to receiving a search criteria and location data from the user device, identify a user location based on the location data,
generate an entity density grid for a geographical area, wherein the entity density grid has one or more nodes, wherein the entity density grid includes a plurality of cells formed by latitude lines and longitudinal lines,
identify a first entity density value for each of the one or more nodes included in the entity density grid, wherein the one or more nodes are intersections of the entity density grid, wherein the first entity density value for each of the one or more nodes is a total number of entities included in four cells surrounding a corresponding node from among the plurality of cells,
identifying a second entity density value for each of the one or more nodes by increasing the first entity density value for each of the one or more nodes based on locations of the entities with respect to each of the one or more nodes,
identify a geographical density of entities corresponding to the user location as a second entity density value of a closest node to the user location,
select one or more access mechanisms based on the search criteria and the geographical density, each access mechanism, when executed by the user device, causes the user device to access a resource identified by the access mechanism, and
control the communication circuitry to transmit search results including the one or more selected access mechanisms to the user device.

14. The electronic device of claim 13, wherein the location data indicates a location of the user device.

15. The electronic device of claim 14, wherein the location data includes a geo-location.

16. The electronic device of claim 13, wherein the processor is further configured to:
for each entity located within the entity density grid, increase a first entity density value of a node closest to each entity.

17. The electronic device of claim 16, wherein a degree of increase for the first entity density value of the node closest to each entity is identified based on a distance between each entity and the node closest to each entity.

18. The electronic device of claim 13, wherein the processor is further configured to:
filter access mechanisms based on the user location.

19. The electronic device of claim 18, wherein the processor is further configured to:
filter out access mechanisms corresponding to entities located outside a geographical boundary about the user location.

20. The electronic device of claim 19, wherein each of a size of the geographical boundary and a shape of the geographical boundary is based on the geographical density of entities.

21. The electronic device of claim 13, wherein the processor is further configured to:
generate a consideration set of function records based on the search criteria, each function record having an associated access mechanism, application state information, and an entity location, and
score the consideration set of function records based on the associated entity location with respect the user location and a correspondence of the application state information to the search criteria.

22. The electronic device of claim 13, wherein the processor is further configured to:
- generate a consideration set of function records based on the search criteria, each function record having an associated access mechanism and an entity location,
- identify a geographical boundary about the user location based on the geographical density of entities, and
- filter out function records from the consideration set having an associated entity location outside the geographical boundary.

23. The electronic device of claim 13, wherein the access mechanism, when executed by the user device, causes the user device to:
- access a native application installed on the user device,
- launch a web browser installed on the user device and access a web resource identified by the access mechanism, or
- access a digital distribution platform and download an application identified by the access mechanism.

* * * * *